(12) United States Patent
Neil

(10) Patent No.: US 8,508,864 B2
(45) Date of Patent: Aug. 13, 2013

(54) OBJECTIVE LENS SYSTEM

(75) Inventor: Iain A. Neil, Massagno (CH)

(73) Assignee: ACM Projektentwicklung GmbH, Salzburg (AT)

( * ) Notice: Subject to any disclaimer, the term of this patent is extended or adjusted under 35 U.S.C. 154(b) by 156 days.

(21) Appl. No.: 12/966,586

(22) Filed: Dec. 13, 2010

(65) Prior Publication Data
US 2011/0102913 A1 May 5, 2011

Related U.S. Application Data

(63) Continuation-in-part of application No. 12/200,487, filed on Aug. 28, 2008, now Pat. No. 7,880,978, which is a continuation-in-part of application No. 12/197,526, filed on Aug. 25, 2008, now abandoned.

(51) Int. Cl.
*G02B 3/02* (2006.01)
*G02B 9/06* (2006.01)

(52) U.S. Cl.
USPC .......................................... 359/717; 359/794

(58) Field of Classification Search
USPC .................... 359/717, 794, 716, 784
See application file for complete search history.

(56) References Cited

U.S. PATENT DOCUMENTS

| | | |
|---|---|---|
| 3,736,049 A | 5/1973 | Shimizu |
| 4,099,849 A | 7/1978 | Lawson et al. |
| 4,249,798 A | 2/1981 | Moskovich |
| 4,260,223 A | 4/1981 | Hamanishi |
| 4,278,331 A | 7/1981 | Tanaka |
| 4,284,331 A | 8/1981 | Tanaka |
| 4,336,983 A | 6/1982 | Tanaka et al. |
| 4,383,173 A | 5/1983 | Neil et al. |
| 4,397,520 A | 8/1983 | Neil |
| 4,398,786 A | 8/1983 | Neil |
| 4,411,488 A | 10/1983 | Neil |
| 4,469,396 A | 9/1984 | Neil |
| 4,479,695 A | 10/1984 | Neil |
| 4,486,069 A | 12/1984 | Neil et al. |
| 4,505,535 A | 3/1985 | Neil |
| 4,558,222 A | 12/1985 | Neil |
| 4,632,498 A | 12/1986 | Neil |
| 4,659,171 A | 4/1987 | Neil |
| 4,695,119 A | 9/1987 | Neil |

(Continued)

FOREIGN PATENT DOCUMENTS

| | | |
|---|---|---|
| EP | 0893725 | 1/1999 |
| EP | 1734393 | 12/2006 |
| JP | 2001033703 | 9/2001 |

OTHER PUBLICATIONS

Neil, Iain A., "Use of Special Glasses in Visual Objective Lenses," SPIE, Recent Trends in Optical Systems Design: Computer Lens Design Workshop, vol. 766, pp. 69-74 (1987).

(Continued)

*Primary Examiner* — William Choi
(74) *Attorney, Agent, or Firm* — Lowenstein Sandler LLP

(57) ABSTRACT

A high performance fixed focal length optical imaging system for example for a cine camera is operable to receive radiation from an object space and deliver the received radiation through the optical system so as to form an image at an image surface in an image space. The imaging system has the advantage of providing high relative illumination and high contrast at elevated spatial frequencies even when using a fast aperture.

23 Claims, 18 Drawing Sheets

(56) References Cited

U.S. PATENT DOCUMENTS

| | | |
|---|---|---|
| 4,726,669 A | 2/1988 | Angenieux |
| 4,786,153 A | 11/1988 | Ogata |
| 5,381,268 A | 1/1995 | Sato |
| 5,638,215 A | 6/1997 | Neil |
| 5,883,696 A | 3/1999 | Bowers et al. |
| 5,920,416 A | 7/1999 | Beylat et al. |
| 6,122,111 A | 9/2000 | Neil et al. |
| 6,144,510 A | 11/2000 | Neil et al. |
| 6,154,312 A | 11/2000 | Tanaka et al. |
| 6,480,681 B1 | 11/2002 | Neil |
| 6,667,836 B2 | 12/2003 | Neil |
| 6,961,188 B2 | 11/2005 | Betensky et al. |
| 6,970,201 B1 | 11/2005 | Neil |
| 7,006,141 B1 | 2/2006 | Neil et al. |
| 7,012,759 B2 | 3/2006 | Betensky et al. |
| 7,085,066 B2 | 8/2006 | Neil |
| 7,123,421 B1 | 10/2006 | Moskovich et al. |
| 7,224,535 B2 | 5/2007 | Neil |
| 7,227,682 B2 | 6/2007 | Caldwell et al. |
| 7,349,062 B2 | 3/2008 | Neil et al. |
| 7,446,944 B2 | 11/2008 | Klein et al. |
| 2006/0262418 A1 | 11/2006 | Chuang et al. |
| 2009/0086340 A1* | 4/2009 | Sato ............................ 359/794 |
| 2009/0257125 A1* | 10/2009 | Take ............................ 359/557 |

OTHER PUBLICATIONS

Neil, Iain A., "A Modern Series of Cinematographic Lenses:From Concept to Product," SPIE, Simulation and Modeling of Optical Systems, vol. 892, pp. 165-172 (1988).

Neil, Iain A., "Ultra High Performance Long Focal Length Lens System with Macro Focusing Zoom Optics and Abnormal Dispersion Liquid Elements for the Visible Waveband," SPIE, vol. 2539, pp. 12-24 (1995).

Neil, Iain A., "High Performance Wide Angle Objective Lens Systems with Internal Close Focusing Optics and Multiple Aspheric Surfaces for the Visible Waveband," SPIE, vol. 2774, pp. 216-242 (1996).

* cited by examiner 33.33 MM 33.33 MM 33.33 MM

OBJECTIVE LENS SYSTEM

REFERENCE TO PRIOR FILED APPLICATIONS

This application is a continuation-in-part of U.S. patent application Ser. No. 12/200,487 filed on Aug. 28, 2008, which is a continuation-in-part of U.S. patent application Ser. No. 12/197,526 filed on Aug. 25, 2008, the contents of which are hereby incorporated by reference.

FIELD OF THE INVENTION

This invention relates to fixed focal length objective lens systems and in particular but not exclusively to objective lens systems suitable for use with fast aperture electronic and film based cameras and operable to produce high quality images with minimal image shading.

DESCRIPTION OF RELATED ART

The advent of high performance electronic detectors, for the detection of radiation in video camera systems, which may be used in high performance imaging applications, has led to a demand for objective lenses that exhibit imaging characteristics and performance features which produce high quality images when used with electronic based image capturing systems. Examples of such high performance imaging applications include cinematography, high definition television ("HDTV") and advanced television ("ATV").

Further, as film emulsion technology continues to improve there is still a demand for objective lenses which maximize the image quality realized from film based image capturing systems. Therefore, to obtain high quality images from both electronic and film based image capture systems new objective lenses are needed to satisfy the various image characteristics for both image capture mediums. Two types of objective lens are commonly employed in high performance imaging applications, fixed focal length (commonly known as 'primes') and zoom lenses. In the case where an objective lens provides close focusing capability it may also be termed a relay lens.

A recent trend in many applications has been the desire for lenses that maximize flexibility of use. In particular, fast aperture lenses of F/2 or less which are compact and lightweight are especially attractive. However, zoom lenses have disadvantages in that they tend to be larger in size, heavier and typically are only capable of providing poorer image quality than prime lenses of equivalent aperture.

For example, U.S. Pat. No. 7,123,421 B1 (the '421 patent) illustrates a recent high performance compact zoom lens design where the full aperture is F/2.7 which is considerably slower than what would be considered a fast aperture (i.e. F/2 or lower) for state of the art prime lenses.

Also, the increased optical and mechanical complexity, in terms of greater number of lens elements and moving groups, typically make zoom lenses larger in size than equivalent aperture primes lenses. Therefore, prime lenses are better suited to meet the aperture and size requirements of high performance imaging applications.

In addition to fast aperture and compactness, a prime lens needs to exhibit high relative illumination over the field of view in order to reduce shading over the image, particularly where the lens is to be utilized with a camera employing an electronic detector.

Another requirement that may increase optical complexity and size is the need for high contrast (MTF (%)) at elevated resolution (spatial frequency (cycle/mm)). This requirement has become more difficult to satisfy because electronic detector development has led to electronic detectors with increased resolution without any reduction in contrast. For example, contemporary silver halide film emulsions and electronic detectors expect a lens to provide high contrast at a resolution of about 20 cycles/mm over a 35 mm cine format (about 28 mm image diagonal image). However, prospective film emulsions and electronic detectors are likely to require similar high contrast but at higher resolution, such as 40 cycles/mm. In addition due to technology improvements in film emulsions and electronic detectors the resolution requirement will probably increase, to 60 cycles/mm and higher. Further, in professional imaging applications as compared to consumer applications, lenses generally tend to be expensive and thus are expected to be long lived over a span of several technology cycles of detector development. To obviate the need for short term lens replacement high contrast at elevated resolution is an important lens requirement.

As will be appreciated by a person skilled in the art the contrast achievable at elevated resolution is related to the magnitude and type of optical aberrations present in the optical system (such as spherical aberration, coma, etc). If the aberrations in a system are well corrected over the field of view then the optical system will perform well and provide images with the desired contrast at high resolution.

The requirement for high relative illumination makes it increasingly difficult to maintain high image quality. This is because in order to have high full-field illumination, the full-field beam size at the last optical surface needs to be large relative to the on-axis beam size. However, when the off-axis beam size is large it means that the bundle of rays passing through the system corresponding to a particular off-axis image point will be spread across a larger cross-sectional area of the component lens elements and will therefore potentially be subject to greater aberrations than would be the case for a narrower bundle of rays.

Also, for a practical design, the lens back focal length needs to be sufficiently large to permit attachment without mechanical collision of a prime lens on a film based camera which may contain a reflex mirror.

Satisfying the competing requirements of high image quality, high relative illumination and constant back focal length may increase the optical and mechanical complexity to such an extent that a prime lens size becomes unacceptably large.

SUMMARY OF THE INVENTION

The invention aims to provide an improved prime objective lens that is not only compact but also provides high relative illumination and high contrast at elevated spatial frequencies even when using a fast aperture.

In a first aspect of the present invention a high performance fixed focal length optical imaging system is provided that is operable to receive radiation from an object space and control the path of the received radiation through the optical system so as to form an image at an image surface in an image space, said optical system comprising a first positively powered lens group and a second positively powered lens group arranged in that order from object space to the image space of the optical system and aligned on a common optical axis, wherein the first positively powered lens group comprises a plurality of optical elements and wherein at least one of the plurality of optical elements is stationary and at least one of the plurality of optical elements has an aspheric optical surface; and the second positively powered lens group comprises at least one optical element and is operable to move axially along the common optical axis for focusing the imaging system, wherein at least one optical element of the second lens group has an aspheric optical surface.

As used herein the terms "high image quality" and "high performance" are intended to refer to an MTF at a spatial frequency of 20 cycles/mm greater than 50% for all fields and preferably greater than 75% for the on-axis field.

The present invention will now be described by way of example in connection with embodiments thereof with reference to the accompanying drawings, however, it is to be noted that various changes and modifications will become apparent to those skilled in the art. Such changes and modifications are to be understood as being included within the scope of the present invention as defined by the appended claims.

BRIEF DESCRIPTION OF THE DRAWINGS

FIG. 3a is a schematic diagram showing the cross sectional beam area of the on-axis and full-field beams at about the last optical surface of the optical system of FIG. 2a;

FIG. 4a is a plot showing the transverse ray aberrations of the full-field beam of FIGS. 2a and 3a;

DETAILED DESCRIPTION OF THE PREFERRED EMBODIMENTS

Figure 1:
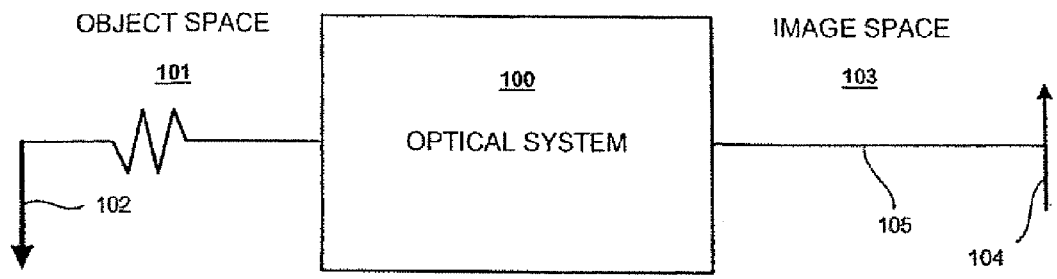
FIG. 1 is a block diagram showing a generic optical imaging system.

FIG. 1 shows a block diagram of a generic image forming optical system 100. The area to the left of the system is known as object space 101 and within object space 101 there is an object 102 to be imaged by the optical system 100. The area to the right of the image is known as image space 103 and within the image space 103 lies an image surface 104 upon which an image may be formed from radiation rays emerging from the optical system 100. Optical system 100 comprises a plurality of lens elements that may be formed from a variety of glass types arranged to manipulate radiation rays originating from object 102 such that upon exiting the optical system 100 the rays form an image of the object 102 at the image surface 104.

In order to better understand the advantages of the present invention the factors that contribute to reduced relative illumination will now be discussed. There are two main factors that contribute to reduced illumination towards the edges of an image. The first is vignetting of the beam area such that the cross-sectional beam area at about the last optical surface of the lens system is less for bundles of rays originating from off-axis object points than for those originating from on-axis points. The relative size of the off-axis beam area at about the last optical surface is determined by the exit pupil of the system which is in turn partly determined by the position of the mechanical stop or iris within the optical system and the position, configuration and properties of the lens elements of the optical system, especially the clear aperture sizes. Normally one or more of the surface clear apertures act to physically limit or vignette the radiation entering the optical system with the amount of vignetting depending on the specific surfaces chosen. The second contribution comes from the well known 'cosine-fourth' effect which tells us that the illumination at an image point is attenuated by a factor of $\cos^4 \theta$ where $\theta$ is the angle which the exit pupil subtends from the image point. The cosine-fourth effect is only likely to be of great significance in wide angle lens designs where the angle $\theta$ may be large particular for full-field image points. Other contributory factors include the transmission properties of the glass elements themselves and pupil aberration where the apparent shape and position of the exit pupil changes for off-axis beams. Transmission and pupil aberration are, however, typically secondary to vignetting and cosine-fourth effect as contributors to reduced relative illumination.

As discussed above one of the main difficulties in obtaining a prime lens that will give high performance at large aperture is the conflict between the requirement for high relative illumination against the need to reduce aberrations and provide high image quality. By employing an optical imaging system according to the invention, it is possible to achieve a very high image quality, that is to say, an MTF at a spatial frequency of 40 cycles/mm greater than 65% for all fields and preferably greater than 75% for the on-axis field. In some instances it is even possible to obtain an ultra high image quality, defined as an MTF at a spatial frequency of 60 cycles/mm greater than 45% for all fields and preferably greater than 55% for the on-axis field. The values of MTF referred to above with reference to the image quality or lens performance should be achieved at the required level of relative illumination, with a minimum relative illumination of 30% at all fields and preferably greater than 35% at all fields.

Figure 2A:
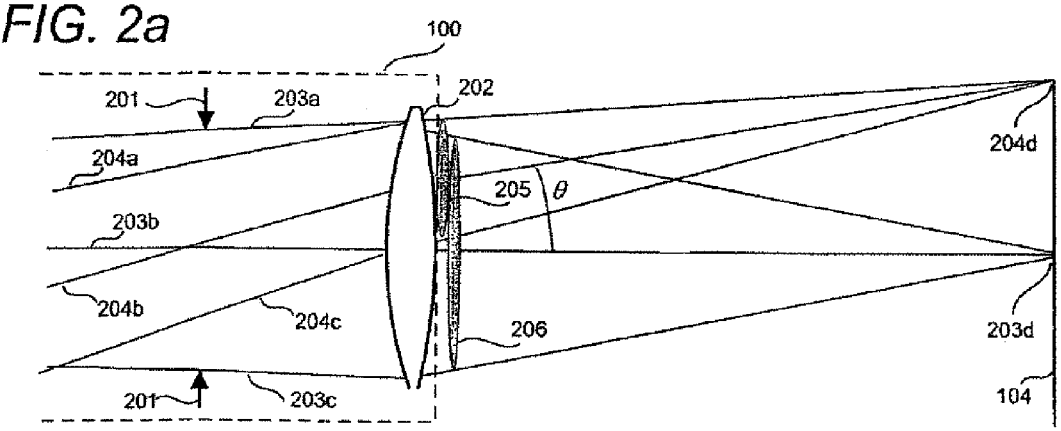
FIG. 2a is a schematic diagram showing a first example of a typical optical imaging system in which the full-field beam size in one direction is narrow.

The problem is illustrated in FIG. 2 which shows an illustrative example of an optical system 100 comprising a mechanical stop 201 and a final lens element 202. Radiation rays originating from an object 102 (such as that shown in FIG. 1) pass through the optical system and the bundle of rays originating from each point of the object 102 in object space 101 is vignetted by one or more optical surfaces. For clarity, only the last optical element 202 of the optical system is shown in FIG. 2a although it should be understood that the optical system 100 may comprise further optical elements (not shown), for example, to the left of the stop 201. The radiation rays exiting from the stop 201 pass through the lens element 202 and subsequently form an image at the image surface 104.

An on-axis ray bundle is depicted by the rays 203a, 203b and 203c which form an axial image point 203d, where 203a and 203c are upper and lower rim rays while 203b is the chief ray. Also, a full-field ray bundle is shown comprising radiation rays 204a, 204b and 204c forming an image point 204d at the upper edge of the image field where 204a and 204c are upper and lower rim rays and 204b is the chief ray. The cross-sectional beam area for the off-axis rays 204a, 204b and 204c at the last optical surface is indicated by the ellipse 205 while the cross-sectional beam area for the on-axis rays is shown by the ellipse 206. The angle subtended by the full-field image point 204d is indicated by the symbol θ. This angle is the relevant angle in determining the $\cos^4 θ$ illumination reduction. Inspection of the full-field ray bundle and in particular the upper rim ray 204c shows that some vignetting of the full-field rays occurs at the top of the surfaces of the lens element 202.

Figure 3A:
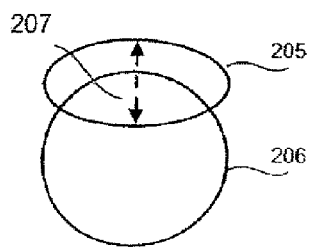

FIG. 3a shows a cross section taken at about the last optical surface showing the beam size of the full-field and on-axis ray bundles 205 and 206. It can be seen that the cross-sectional beam width is substantially the same for both beams 205 and 206 but the beam height is significantly less for the full-field beam than the on-axis beam. Thus, in the optical system illustrated in FIG. 2a the beam size at the last optical surface is much smaller for the full-field rays than for the on-axis rays. This means that the illumination at the full-field image point 204d relative to the illumination at the on-axis point 203d will be greatly reduced. Further reduction will occur as a result of the cosine-fourth effect but the contribution in this case will be less because of the small angle θ subtended by the full-field image point 204d. In order to improve the relative illumination a lens designer may attempt to increase the amount of radiation passing through the system from off-axis beams by carefully arranging and selecting the clear aperture diameters of lens elements in the optical system.

Figure 2B:
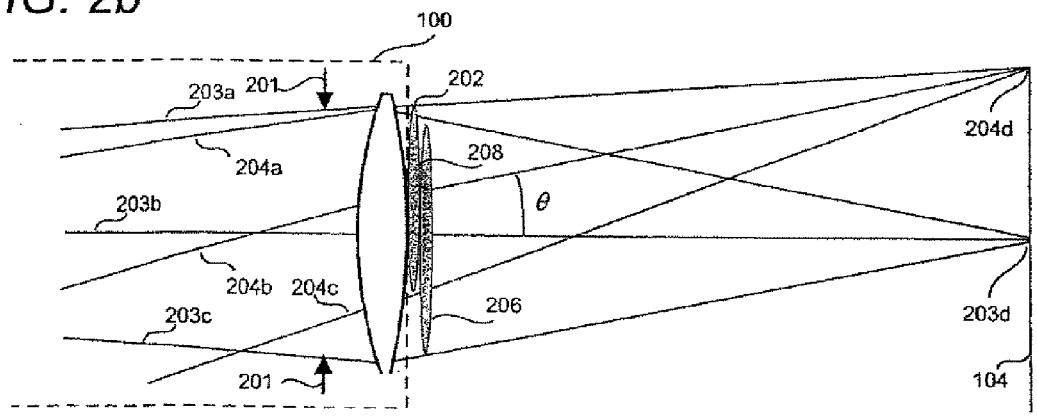
FIG. 2b is a schematic diagram showing a second example of a typical optical imaging system in which the full-field beam size in one direction is broad.
Figure 3B:
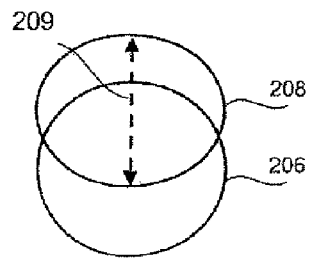
FIG. 3b is a schematic diagram showing the cross sectional beam area of the on-axis and full-field beams at about the last optical surface of the optical system of FIG. 2b.
Figure 4A:
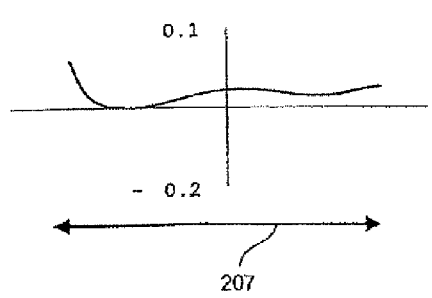
Figure 4B:
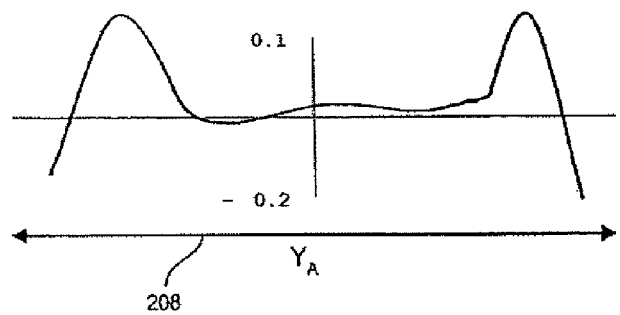
FIG. 4b is a plot showing the transverse ray aberrations of the full-field beam of FIGS. 2b and 3b.

For example, FIG. 2b shows the same arrangement as in FIG. 2a but with the stop 201 repositioned to be further towards the rear of the lens system 100 and where the lower rim ray 204c is less vignetted by lens element clear apertures preceeding the stop (not shown). By repositioning the stop, the vignetting of the upper ray 204a of the full-field ray bundle is reduced and more radiation is allowed to pass through the optical system. The amount of radiation passing through the stop for the on-axis beam, however, remains substantially the same as before. The relative beam sizes are shown in cross-section in FIG. 3b. The cross-sectional area 208 is much larger than for the vignetted beam 205 of FIG. 3a. However, the reduction in vignetting introduces a different problem in that the quantity and size of optical aberrations in the system increase as a result of the increase in the off-axis beam size This is illustrated in FIGS. 4a and 4b which show the transverse ray aberrations plotted as a ray-intercept plot for the full-field beam 205 of FIGS. 2a and 3a and the full-field beam 208 of FIGS. 2b and 3b respectively. The transverse measure of an aberration is directly related to the size of image blur and thus substantially the quality of the image produced by the relevant optical system, because there is still diffraction to be considered however small it may be. The plots of FIGS. 4a and 4b are of a conventional form, which would be familiar to a person skilled in the art, wherein the vertical axis represents the ray intercept height in mm measured about the chief ray position (at an intermediate reference wavelength of 546.074 nm) at the image plane and the horizontal axis represents the a dimensionless width of the beam of radiation.

FIG. 4a corresponds to the vertically narrow full-field beam 207 of FIG. 3a and the aberrations are small across the length of the lens. However, in FIG. 4b, corresponding to the less vignetted beam 209 of FIG. 3b, the beam height is greater than in the lens system of FIG. 2a. The aberrations in the centre of the plot are comparable to those of FIG. 4a but additional and larger higher order aberrations are present towards the edge of the beam. Correction of the additional aberrations may be necessary in order to achieve high contrast at the elevated spatial frequencies required to produce high quality images suitable for state of the art and future high end electronic cameras. In the above described example the stop is a mechanically defined aperture 201 but, as will be appreciated by a person skilled in the art, the limiting aperture for off-axis beams in a real optical system is defined by the arrangement of lens elements and physical stops such as the clear apertures of lens element surfaces within the optical system.

Figure 5:
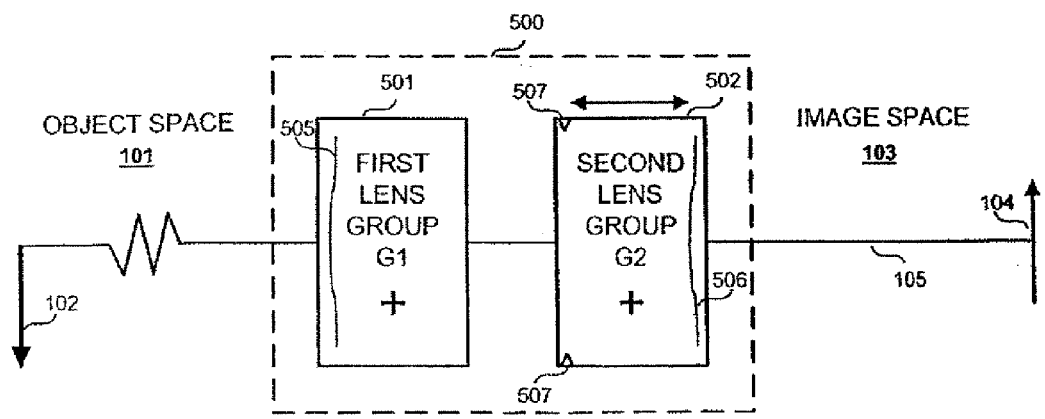
FIG. 5 is a block diagram of a first lens group power configuration falling within the scope of the present invention.

With the above in mind embodiments of the present invention will now be discussed. FIG. 5 shows a first lens group configuration 500 that falls within the scope of the present invention that comprises a first lens group (G1) 501 and a second lens group (G2) 502 both lens groups 501 and 502 being aligned along a common optical axis 105. The first lens group 501 and the second lens group 502 being configured such that the aberrations resulting from a large off-axis beam can be controlled sufficiently to allow the formation of a high quality image at the image surface 504 throughout the focus range.

In particular, the first lens group 501 is fixed relative to the optical axis and contains lens elements that combine to make the lens group positively powered. In addition, the first lens group 501 comprises a front aspherical lens element 505 positioned close to the front of the first lens group 501 which has been found to assist in aberration correction.

The second lens group (G2) 502 is axially moveable in both directions along the optical axis 105 for the purpose of focusing the image system on the object 102 in object space 102 to produce a focused image at the image plane 104 in image space 102. The second lens group 502, like the first lens group 501, is positively powered and comprises a rear aspherical lens 506 which is preferably positioned towards the rear of the second lens group 502. In addition, the second lens group 502 also comprises a mechanical aperture or stop 507 positioned at the front of the lens group. The stop forms part of the second lens group 502 and thus moves in conjunction with the lens elements of the group about the optical axis for focusing.

Figure 6:
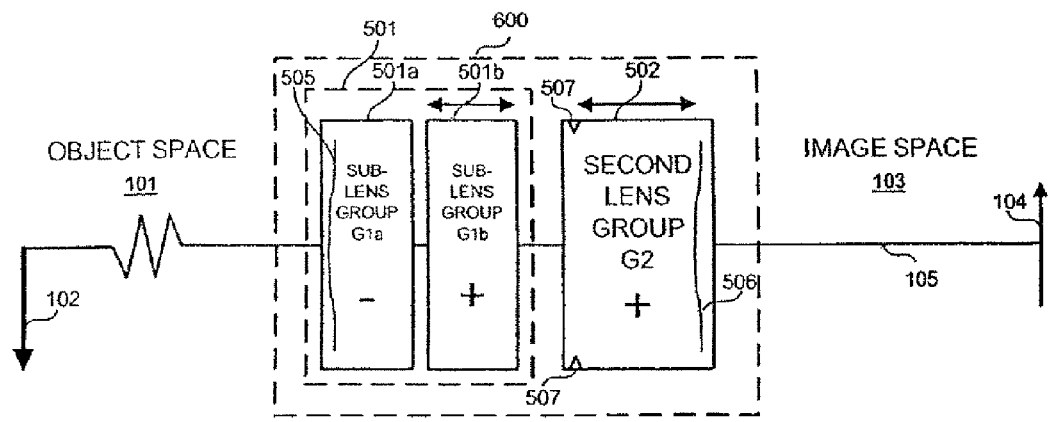
FIG. 6 is a block diagram of a second lens group power configuration, said configuration being a sub-set of the configuration of FIG. 5, falling within the scope of the present invention.

FIG. 6 shows a second lens group configuration 600 falling within the scope of the present invention which is a sub-set of the configuration shown in FIG. 5. In this configuration the first lens group 501 further comprises two sub-lens groups (G1a and G1b) 501a and 501b respectively. The first sub-lens group 501a is negatively powered, includes the front aspherical lens 505, and is fixed relative to the optical axis 105. The second sub-lens group 501b is positively powered and is axially moveable about the optical axis. In this configuration the combination of movement of the second sub-lens group 501b and the second lens group 502 permits focusing of the optical system across the focus range while maintaining the high performance characteristics of the lens.

First Embodiment

A preferred embodiment of the present invention will now be described by way of design examples with reference to FIGS. 7 and 8a to 8c, corresponding Table 1 and the optical prescription data contained therein which is extracted from data produced by CODEV V® optical design software that is commercially available from Optical Research Associates, Inc., Pasadena, Calif., U.S.A. All of the data contained herein is given at a temperature of 25° C. (77° F.) and standard atmospheric pressure (769 mm Hg).

Figure 7:
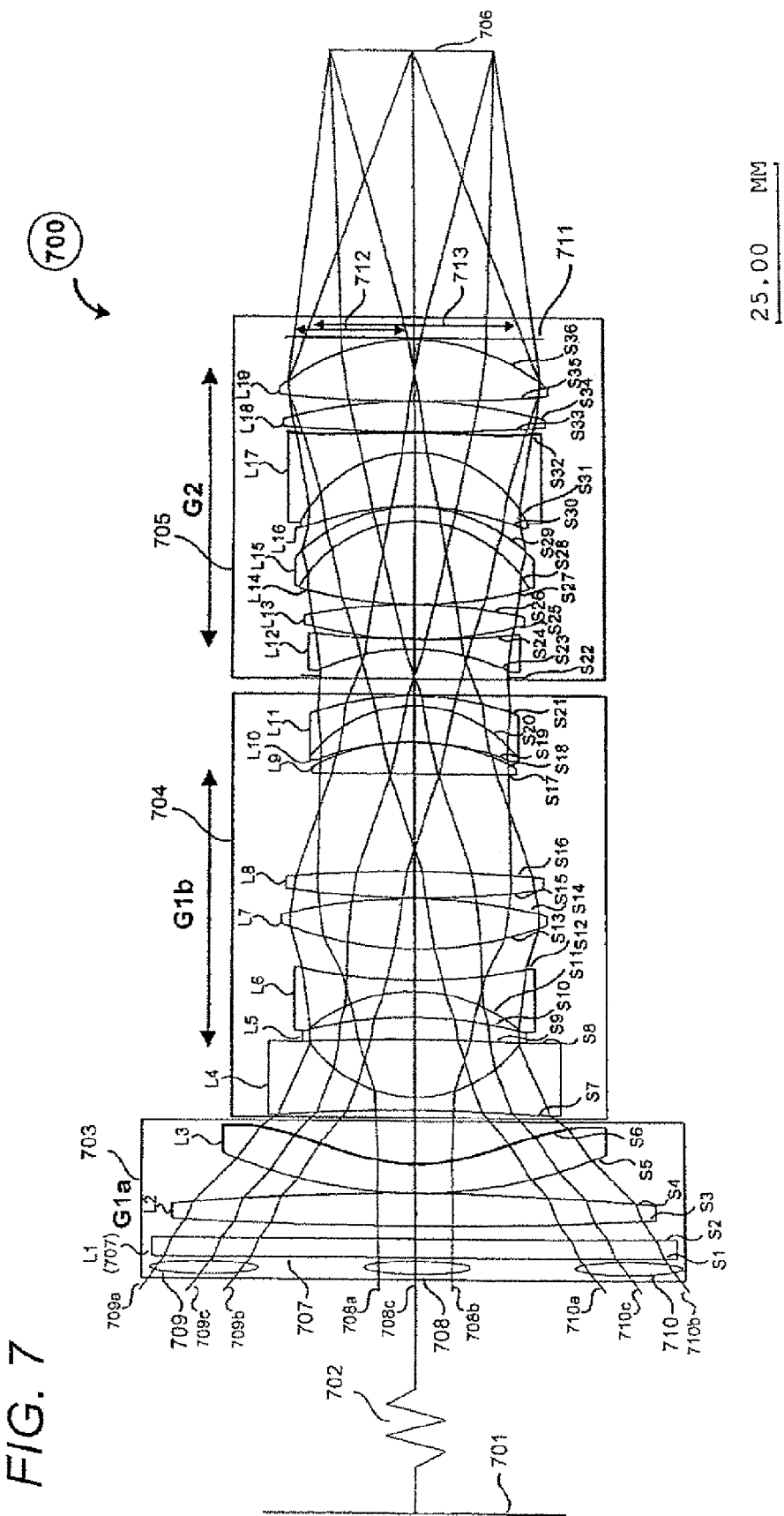
FIG. 7 is a schematic diagram showing the optical lens design of a first embodiment of the present invention.

Turning now to FIG. 7, in a preferred embodiment of the present invention a wide-angle prime lens 700 with a fixed focal length of substantially 18 mm is shown that comprises a plurality of lens elements. The lens 700 is configured in accordance with the lens group power configuration 600 illustrated in FIG. 6 and already described above. Each lens element is identified by a label comprising the letter 'L' and a numeral ranging from 1 through 19. The shape and configuration of each lens element being as depicted while the specific radius of each lens surface is given in Table 1, each surface being identified by a label comprising the letter 'S' followed by a numeral. The surfaces are numbered in sequence starting at S1 for the surface nearest the object side of the lens and ending S36 for the last optical surface at the rear of the lens. While only the lens elements are shown in FIG. 7 it is to be understood that conventional mechanical devices and mechanisms are provided (but not shown) for supporting the lens elements and for causing axial movement of the moveable lens groups in a conventional lens housing or barrel.

TABLE 1

Optical Prescription

| Item | Group | Sub Group | Surface | Focus Position | Separation (mm) | Radius of Curvature[1] (mm) | Material[2] Type | Code | Name | Aperture Half Diameter (mm) |
|---|---|---|---|---|---|---|---|---|---|---|
| Object Plane | | | S0 | F1 | 1000010.000 | | Flat | Air | | |
| | | | | F2 | 340.000 | | | | | |
| | | | | F3 | 149.300 | | | | | |
| L1 | G1 | G1a | S1 | All | 3.000 | Flat | Glass | 516641 | SBSL7 | 41.46 |
| | | | S2 | All | 2.000 | Flat | Air | | | 40.23 |
| L2 | G1 | G1a | S3 | All | 5.319 | 743.582 | Glass | 741527 | SLAL61 | 38.13 |
| | | | S4 | All | 0.100 | −444.221 | Air | | | 37.07 |
| L3 | G1 | G1a | S5 | All | 4.628 | 84.191 | Glass | 497816 | SFPL51 | 30.10 |
| | | | S6 | F1 | 7.955 | 34.230 | Air | | | 26.45 |
| | | | | F2 | 8.654 | | | | | |
| | | | | F3 | 9.612 | | | | | |
| L4 | G1 | G1b | S7 | All | 2.143 | −348.149 | Glass | 744448 | SLAM2 | 22.90 |
| | | | S8 | All | 9.220 | 22.024 | Air | | | 17.47 |
| L5 | G1 | G1b | S9 | All | 3.639 | −456.055 | Glass | 805254 | STIH6 | 17.47 |
| | | | S10 | All | 4.227 | −74.848 | Air | | | 17.51 |
| L6 | G1 | G1b | S11 | All | 1.797 | −28.133 | Glass | 439950 | SFPL53 | 17.48 |
| | | | S12 | All | 5.106 | 91.226 | Air | | | 18.79 |
| L7 | G1 | G1b | S13 | All | 8.107 | 64.263 | Glass | 750353 | SNBH51 | 20.79 |
| | | | S14 | All | 0.100 | −93.119 | Air | | | 20.81 |
| L8 | G1 | G1b | S15 | All | 4.196 | 158.090 | Glass | 883408 | SLAH58 | 20.21 |
| | | | S16 | All | 15.761 | −248.087 | Air | | | 19.90 |
| L9 | G1 | G1b | S17 | All | 5.160 | −2854.002 | Glass | 439950 | SFPL53 | 15.96 |
| | | | S18 | All | 0.100 | −38.221 | Air | | | 15.92 |
| L10 | G1 | G1b | S19 | All | 5.784 | −44.742 | Glass | 618634 | SPHM52 | 15.74 |
| L11 | G1 | G1b | S20 | All | 1.594 | −22.431 | Glass | 801350 | SLAM66 | 15.74 |
| | | | S21 | F1 | 4.734 | −53.944 | Air | | | 16.28 |
| | | | | F2 | 3.136 | | | | | |
| | | | | F3 | 1.300 | | | | | |
| Stop | G2 | | S22 | All | 4.365 | Flat | | | | 15.80 |
| L12 | G2 | | S23 | All | 1.546 | −38.945 | Glass | 750353 | SNBH51 | 15.73 |
| | | | S24 | All | 0.1110 | 155.115 | Air | | | 16.57 |
| L13 | G2 | | S25 | All | 5.488 | 75.043 | Glass | 439950 | SFPL53 | 16.99 |
| | | | S26 | All | 0.100 | −95.658 | Air | | | 17.31 |
| L14 | G2 | | S27 | All | 13.271 | 77.145 | Glass | 439950 | SFPL53 | 17.88 |
| L15 | G2 | | S28 | All | 2.193 | −23.136 | Glass | 816466 | SLAH59 | 17.95 |
| | | | S29 | All | 0.100 | −28.966 | Air | | | 18.89 |

TABLE 1-continued

Optical Prescription

| Item | Group | Sub Group | Surface | Focus Position | Separation (mm) | Radius of Curvature[1] (mm) | Material[2] Type | Code | Name | Aperture Half Diameter (mm) |
|---|---|---|---|---|---|---|---|---|---|---|
| L16 | | G2 | S30 | All | 8.684 | −52.538 | Glass | 439950 | SFPL53 | 17.91 |
| L17 | | G2 | S31 | All | 3.258 | −22.076 | Glass | 750353 | SNBH51 | 17.78 |
| | | | S32 | All | 0.100 | −162.615 | Air | | | 20.05 |
| L18 | | G2 | S33 | All | 4.777 | 348.045 | Glass | 808228 | SNPH1 | 20.42 |
| | | | S34 | All | 0.100 | −88.883 | Air | | | 20.75 |
| L19 | | G2 | S35 | All | 9.721 | 271.963 | Glass | 618634 | SPHM52 | 21.27 |
| | | | S36 | F1 | 44.800 | −37.754 | Air | | | 21.41 |
| | | | | F2 | 45.699 | | Air | | | |
| | | | | F3 | 46.577 | | Air | | | |
| Image Plane | | | S37 | All | 0.000 | Flat | Air | | | |

Notes:-
[1]Surface profiles of aspheric surfaces 6 and 32 are governed by the following conventional equation:

$$Z = \frac{CURV(R)^2}{1 + (1 - (1+K)(CURV)^2 R^2)^{1/2}} + (A)R^4 + (B)R^6 + (C)R^8 + (D)R^{10} + (E)R^{12} + (F)R^{14}$$

where:
CURV = 1/(Radius of Curvature)
K, A, B = Coefficients
Z = Position of surface profile for a given Y value or measured along the optical axis from the pole (i.e. axial vertex) of the surface
R = Radial aperture height of surface measured from the X and Y axis, where:
$R = (X^2 + Y^2)^{1/2}$
The coefficients for the surface S6 are:
$K = 0.2145, A = -0.94422 \times 10^{-05}, B = -0.1178 \times 10^{-07}, C = -0.6305 \times 10^{-11}, D = -0.6072 \times 10^{-14}, E = -0.1659 \times 10^{-16},$ and $F = -0.1548 \times 10^{-19}$.
The coefficients for the surface S32 are:
$K = 0.0000, A = 0.631 \times 10^{-05}, B = 0.1691 \times 10^{-08}, C = -0.2004 \times 10^{-11}, D = 0.224381 \times 10^{-14}, E = 0.1305 \times 10^{-16}$ and $F = 0.1259 \times 10^{-19}$.
[2]The glasses listed are available from Ohara Corporation.

The table contains a first column indicating labeled 'Item' which gives the lens element number or the name of the object referred to in the corresponding rows. The next two columns are labeled 'Group' and 'Sub Group' respectively and gives the group and sub-group (if appropriate) that the 'Item' belongs to. The fourth column is labeled 'Surface' and gives the label of the relevant surface as indicated in FIG. 7. The next two columns are labeled 'Focus Position' and 'Separation'. The column 'Separation' gives the distance in mm between the surface corresponding to a particular row and the next adjacent surface. The separations have been calculated for three focus positions (F1, F2 and F3) and the relevant focus position is therefore indicated in the column labeled 'Focus Position'. The seventh column gives the 'Radius of Curvature' of the surface referred to by a particular row where a minus sign indicates that the radius of curvature is to the left of the surface, as viewed in FIG. 7 and "Flat" meaning either an optically flat surface (such as the filter L1) or a dummy optical surface (such as the stop S22). Surfaces S6 and S32 are aspheric surfaces for which the 'radius of curvature' is a base radius and the formula and coefficients for those two surfaces are set forth as a footnote to Table 1.

The next three columns of the table relate to the 'Material' between the surface referred to by the present row and the next adjacent surface towards the rear of the lens. The 'Type' column indicates whether the material is a lens (Glass) or empty space (Air) between the present and next surface. All of the lenses are glass and the column 'Code' identifies the optical glass type. For convenience, all of the lens glass has been selected from glass available from Ohara Corporation and accordingly the column 'Name' gives the Ohara identification for each glass type. It will, of course, be appreciated by a person skilled in the art that any equivalent or adequate glass type may be used.

The last column of Table 1 is headed 'Aperture Half Diameter' and provides the aperture radius for each surface through which the radiation rays pass. All of the half diameters are given for a wavelength of 546.074 nm The position of the object to be imaged is indicated by the vertical line 701 crossing the optical axis at the object side of the lens. The object plane is labeled as the surface S0 in the optical prescription. The horizontal position of the object to be imaged (and therefore focus distance) may vary and this is indicated by the jagged line 702 between the first optical surface S1 and the object plane S0. The image plane 706 is indicated by a vertical line in image space to the right of the last optical surface and in this embodiment comprises a 28 mm image diagonal representative of the size of image plane suitable for a 35 mm cine (cinematography as in the motion picture industry) camera. All the surfaces are spherical with the exception of lens surfaces S6 and S32 which are aspheric surfaces that are non-spherical, non-plano but rotationally symmetrical about the optical axis.

The grouping of the lens groups into sub-lens groups G1*a* and G1*b* and second lens group G2 (corresponding the respective groups shown in FIG. 6) is indicated by boxes 703, 704 and 705 respectively. The second sub-lens group (G1*b*) 704 and the second lens group (G2) are movable in both directions about the optical axis in a monotonic fashion (i.e. in only one direction when progressing from one extreme of the focus range to the other) for focusing radiation emanating from the object 701 on the image plane 706. The optical power of the first sub-lens group 703, the second sub-lens group 704 and the second lens group 705 is negative, positive and positive respectively. More specifically the respective focal lengths of each group are −179.99 mm, +95.67 mm and +41.48 mm. It should be noted that regardless of focus position the combined focal length of the first and second sub-lens groups 703 and 704 is always positive which is consistent with the lens configuration of FIGS. 5 and 6.

In addition to the powered lens elements L2 and L3 the first lens group 703 further comprises an optical filter element (L1) 707 positioned at the front of the group 703. The filter 707 comprises an element of glass with two flat surfaces S1 and S2 and is therefore has neither negative nor positive net optical power. As will be appreciated by a person skilled in the art other embodiments are possible where no such filter or a different filter or a combination of filters is employed.

The fixed first sub-lens group (G1a) 703 comprises a biconvex singlet element L2 followed by an aspherical meniscus singlet element L3. The equation and corresponding coefficients governing the surface profile of the aspheric surface S6 of the meniscus lens is given in Table 1.

The second sub-lens group (G1b) 704 comprises eight lens elements which are (from left to right) a first biconcave singlet L4, a meniscus singlet L5, a second biconcave singlet L6, a first biconvex singlet L7, a second biconvex singlet L8, a second meniscus singlet L9 and a doublet element comprising a positive and negative meniscus element L10 and L11. The elements are generally closely spaced with the exception of the small gap between S12 and S13 and the larger gap between S16 and S17.

The second lens group 705 comprises a field stop S22 (or iris diaphragm) and eight lens elements (from left to right) a biconcave single L12, a first biconvex singlet L13, a doublet comprising a positive meniscus and a negative meniscus element L14 and L15, a second doublet comprising a positive meniscus L16 and an aspheric biconcave element L17, a second biconvex singlet L18 and a third biconcave singlet L19. As in FIGS. 5 and 6 the iris S22 is located within the second lens group 705 and moves axially therewith. The size of the aperture of iris S22 is adjustable and, as will be described in more detail below, the lens is capable of excellent performance even with the iris as wide as approximately f/1.4.

It should be noted that the specific design uses a number of unusual glass types, in particular, the abnormal dispersion glasses with the designations SFPL51 and SFPL53 given to them by the Ohara Corp. By utilizing a plurality of such glass types in the design further degrees of freedom become available to the designer enabling aberrations and in particular chromatic aberration to be reduced. In this embodiment the glass type SFPL51 is used for lens element L3 while glass type SFPL53 is used for lens elements L6, L9, L13, L14 and L16. Further, it has been found that aberration correction can be improved further by utilizing a lens element comprising a very dense flint glass in the second lens group G2. In this embodiment said dense flint glass named SNPH1 is used for lens element L18 (G2 S33 . . . 34 Table 1) to introduce a large secondary dispersion aberration which substantially compensates for secondary dispersion aberration introduced elsewhere in the lens.

Even though these abnormal partial dispersion types of glass are thermally sensitive the overall optical and mechanical construction has been optimized by employing commonly available glasses and metal materials such as aluminum so that the lens system is rendered substantially athermal and produces insignificant changes in aberration correction.

Figure 8A:
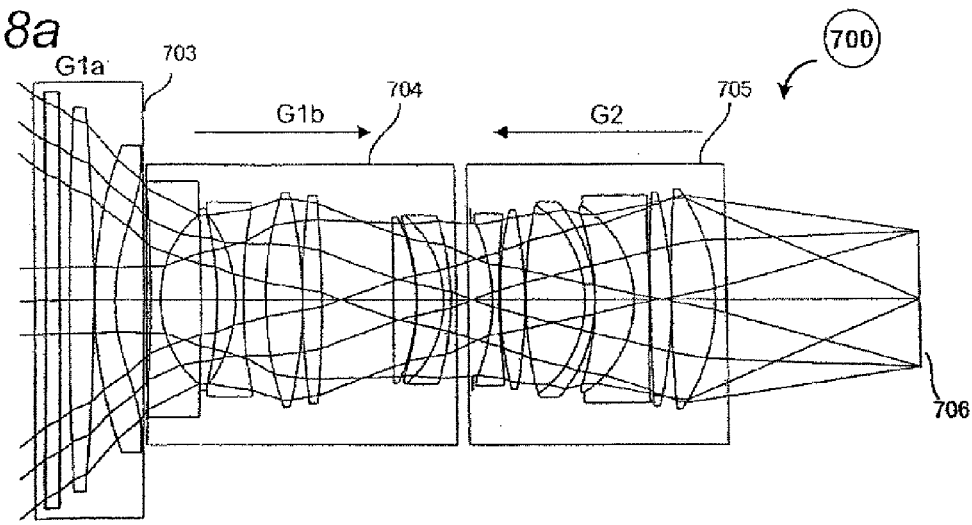
FIGS. 8a, 8b and 8c are schematic diagrams showing the position of the components of the optical lens of FIG. 7 to produce focus distances of infinity, intermediate and close focus respectively.
Figure 8B:
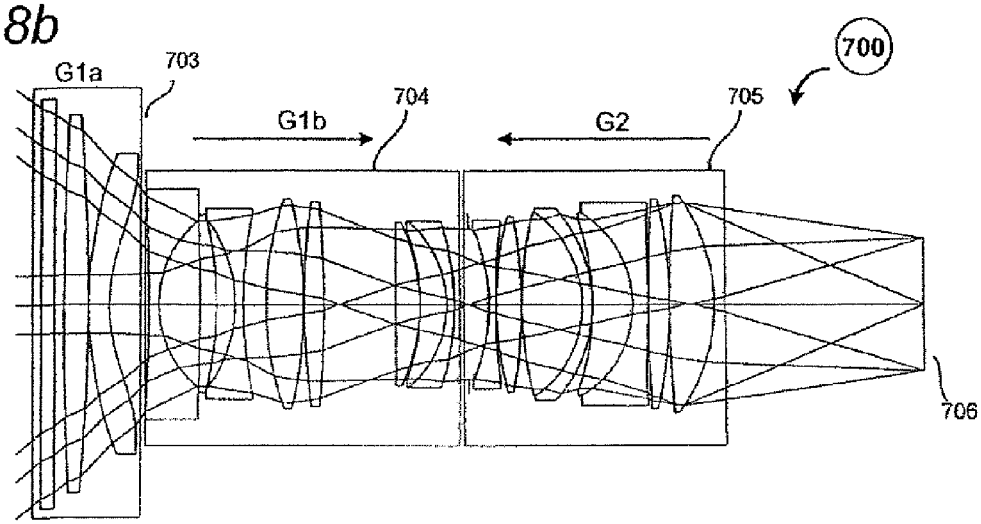
Figure 8C:
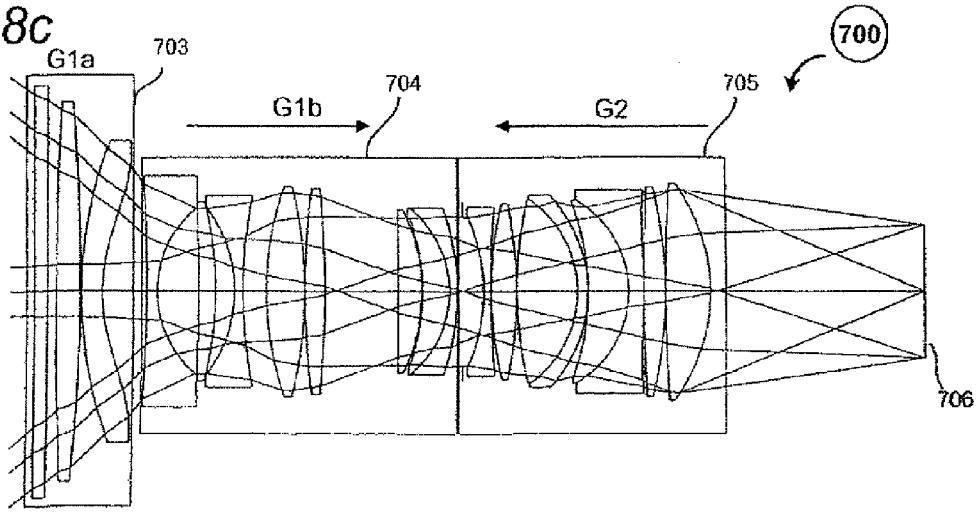

In order to better describe the movement of the groups during focusing, FIGS. 8a to 8c depict the position of the lens groups at three different focus positions.

Turning to FIG. 8a the lens system is shown configured to image an object at infinity. FIG. 8b depicts the position of the lens groups at intermediate focus (determined to be when the object plane is approximately 34 cm from the first optical surface S1) while FIG. 8c depicts the position of the lens elements at close focus (approximately 15 cm from the first optical surface). The specific distances between the groups for the three focus positions F1, F2 and F3 (infinity, intermediate and close) are given in Table 1 as the separation distances for S6 and S21 which corresponds to the separation between the first sub-lens group and the second sub-lens group and the separation between the second sub-lens group and the second lens group respectively. The arrows depict the direction of motion of the groups as they are moved between focus positions. The second sub-lens groups moves from left to right (towards the rear of the lens) while the second lens group moves from right to left (towards object space) with decreasing focus distance. It should be understood that the lens groups 704 and 705 are of course operable to move in the opposite directions when increasing focus distance.

The moveable groups 704 and 705 are each axially moveable independently and their respective movements are coordinated by any convenient means, such as conventional mechanical devices such as cams or the like to accomplish the desired focusing functionality. The respective axial movement of the second sub-lens group 704 is coordinated with the second lens group 705.

FIGS. 7 and 8a to 8c also depict ray traces of on-axis 708 and full-field upper and lower ray bundles 709 and 710. For each ray bundle 708, 709 and 710, respective upper and lower rim rays 707a, 708a, 709a and 707b, 708b, 709b and chief rays 707c, 708c and 709c are shown with the on-axis chief ray lying on the optical axis 702.

Figure 9:
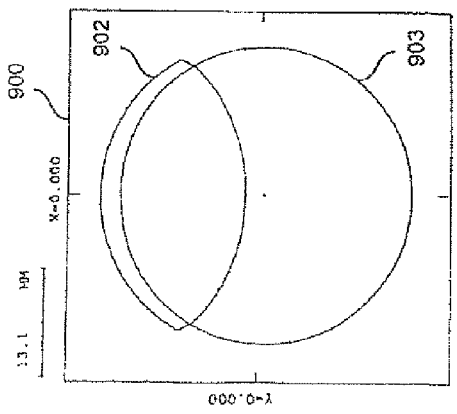
FIG. 9 is a diagram showing the full-field and on-axis beam areas at about the last optical surface of the optical lens of FIG. 7.

As discussed above the beam size at the last optical surface is the largest significant factor when determining relative illumination where the cosine-fourth angle is relatively small. A cross sectional vertical line 711 defines a flat surface directly in front of the last optical surface S36. The beam height for the upper full-field and on-axis ray bundles 709 and 708 at the surface 711 is indicated on FIG. 7 by the vertical double headed arrows 712 and 713 respectively. FIG. 9 shows the relative cross sectional beam area for ray bundles 710 and 708 entering the system on-axis 903 and full-field 902 respectively. As shown the cross-sectional area of the full-field beam 902 is around 42% of the on-axis beam area 901. The relatively large cross-sectional full-field beam area means that the lens will have good relative illumination characteristics provided the losses due to cosine-fourth effect, transmission loss and pupil aberration are small.

Figure 10A:
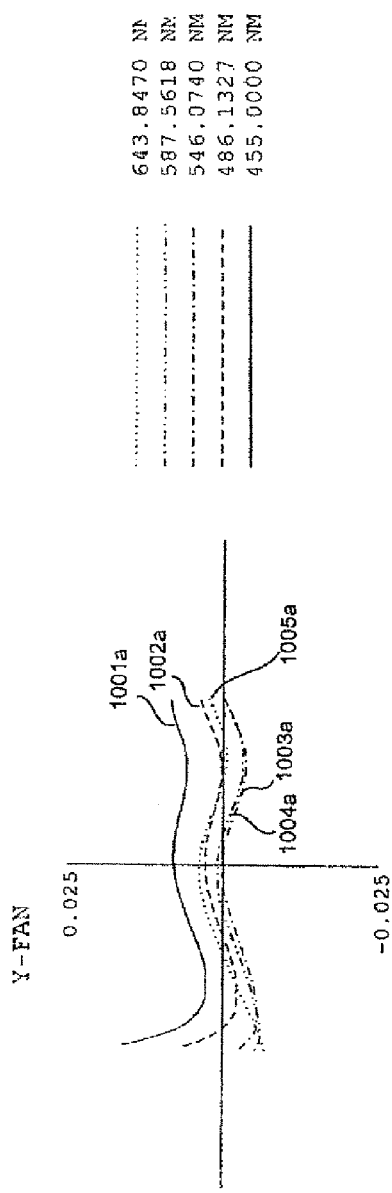
FIG. 10a is a plot showing the transverse ray aberrations in the Y direction for the full-field beam of FIG. 9.
Figure 10B:
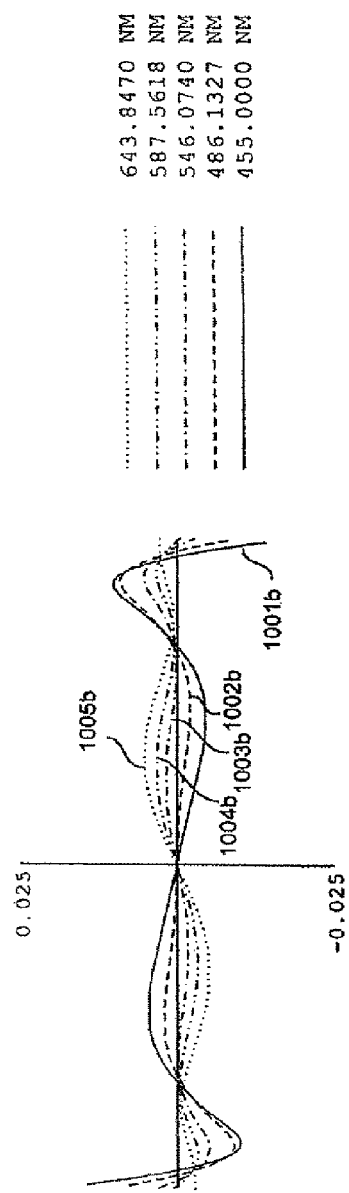
FIG. 10b is a plot showing the transverse ray aberrations in the X direction for the on-axis beam of FIG. 9.

FIGS. 10a and 10b show the transverse ray aberrations plotted as a ray-intercept plot for the full-field and on-axis beams respectively. The transverse measure of an aberration is directly related to the size of image blur and thus substantially the quality of the image produced by the relevant optical system. The plots are of a conventional form which would be familiar to a person skilled in the art and are as described before for FIGS. 4a and 4b.

The aberrations are plotted for five wavelengths 1001a to 1005a and 1001b to 1005b in each of FIGS. 10a and 10b respectively. A first line 1001a and 1001b indicates a wavelength of 643.847 nm, a second line 1002a and 1002b indicates a wavelength of 587.5618 nm, a third line 1003a and 1003b indicates a wavelength of 546.0740 nm, a fourth line 1004a and 1004b indicates a wavelength of 486.1327 nm and a fifth and final line 1005a and 1005b indicates a wavelength of 455 nm. As can be seen from FIGS. 10a and 10b, and as will be appreciated by a person skilled in the art, the aberrations are well corrected in both FIGS. 10a and 10b with a ray aberration height of around 0.01 mm for all but the most extreme rays of the on-axis beam. The low aberrations in the Figures are evidence that the image quality has not been compromised by the large beam size at full-field. This will now be further verified by reference to derived optical performance data described below.

Optical performance data of the prime lens system is set forth below in Table 2 wherein the full-field relative illumination in percent (%) and the full-field distortion in percent (%) is given for each of the focus positions F1 to F3 and normalized image heights ranging from 0 to 1 (wherein the normalized image height is the actual image height(mm) divided by the maximum image height(mm)). For state of the art detectors a relative illumination in the region of 40% is preferred in order to minimize shading normally at the corners of an image. Note that the full-field relative illumination (corresponding to the maximum image height) in Table 2 ranges from 45% to 51.5% across the focus range given by the three focus positions F1-F3. Note also that low distortion of less than 2.02% is maintained across the focus range.

The field of view may change with focusing which will change the image size seen at the detector. This is the so-called "breathing" problem. Breathing is particularly noticeable where there is a large depth of field as features other than the focus subject of the image will be relatively clear. Thus breathing is a particularly important performance metric for wide-angle lenses such as the 18 mm lens described above. Assuming a constant image height with corresponding object space full-field angles then breathing can be defined as:

$$\text{breathing (\%)} = 100 \times \frac{\text{(angle at infinity focus)} - \text{(angle at close focus)}}{\text{(angle at infinity focus)}} \quad (1)$$

wherein the angles referred to therein are the full-field principal ray angles in object space (with the angles being determined by tracing rays back from the image point at full-field to object space for each focus position). The breathing has been calculated for the 18 mm lens of the first embodiment 700 described above in accordance with equation (1) giving a value of +2.4% which is very low and would not produce excessive changes in the image size.

TABLE 2

18 mm Performance Data
Relative Illumination (%) and Distortion (%)

| Focus Position | Performance Data Description | Normalized Image Height | | | | |
|---|---|---|---|---|---|---|
| | | 0 | 0.40 | 0.65 | 0.85 | 1 |
| F1 | Distortion | 0 | −41.69 | −1.50 | −2.01 | −1.99 |
| | Relative Illumination | 100 | 83.8 | 70.6 | 56.6 | 45.0 |
| F2 | Distortion | 0 | −0.63 | −1.30 | −1.59 | −1.30 |
| | Relative Illumination | 100 | 84.2 | 79.1 | 58.6 | 47.3 |
| F3 | Distortion | 0 | −0.54 | −1.02 | −1.00 | −0.35 |
| | Relative Illumination | 100 | 86.7 | 75.3 | 62.7 | 51.5 |

Figure 11A:
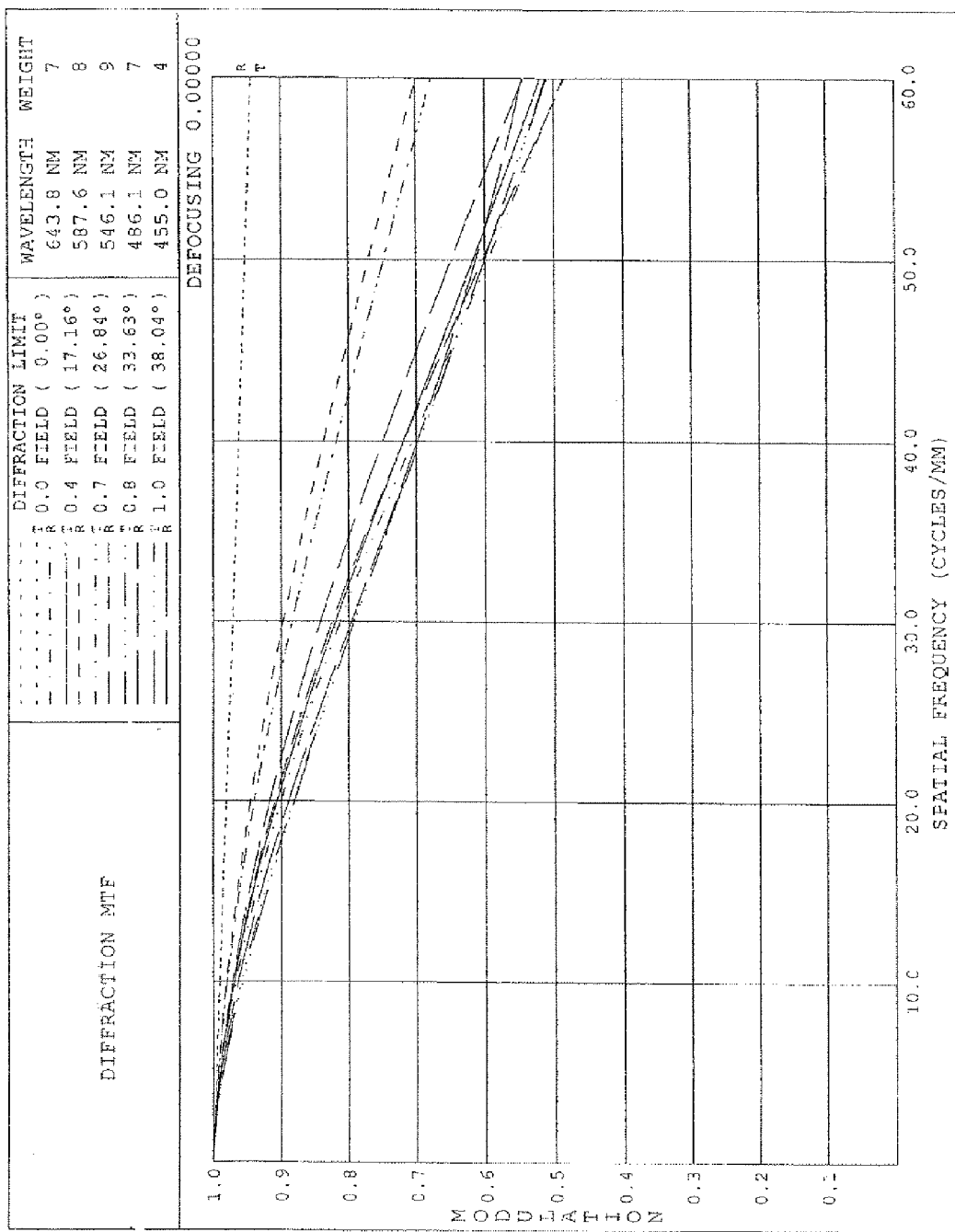
FIGS. 11a, 11b and 11c are performance diagrams of the objective lens system of FIG. 7 illustrating contrast (MTF modulation in %) over the field of view versus resolution (spatial frequency in cycles/mm) measured at the image surface for three focus distances of FIGS. 8a, 8b and 8c respectively.
Figure 11B:
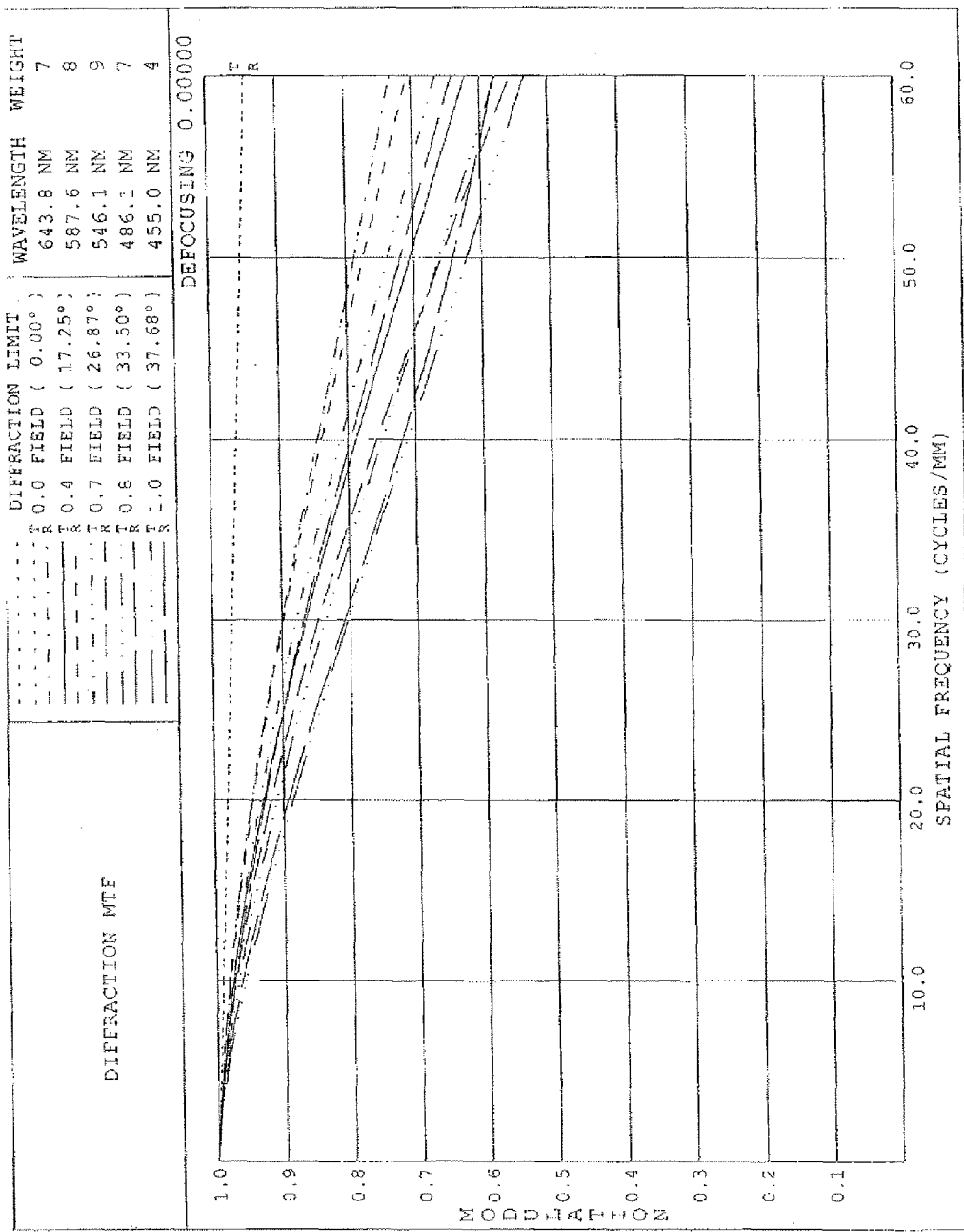
Figure 11C:
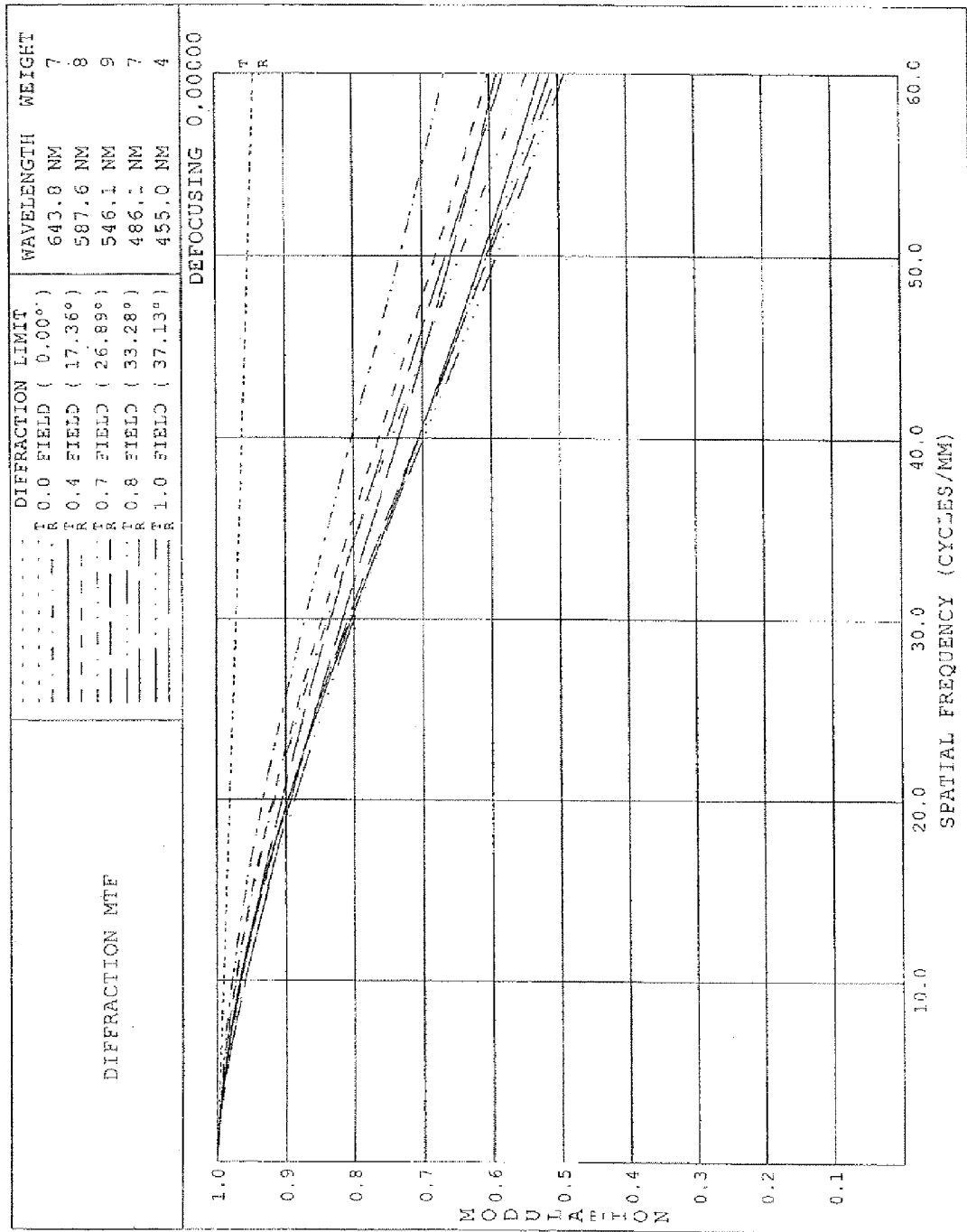

Further optical performance data is set forth in FIGS. 11a to 11c which comprise plots showing the diffraction based polychromatic modulation transfer function or 'MTF' (the modulation at a particular spatial frequency) as a percentage versus spatial frequency for the three focus positions F1, F2 and F3 respectively.

Turning now to FIG. 11a shown is the tangential and radial MTF at 5 field positions ranging from on-axis (0.00°) to full-field (37.13°). The spatial frequency is given in cycles/mm which is a standard measurement of optical performance used by persons skilled in the art referring to the number of pairs of black and white lines per millimeter on a chart from which the clarity and MTF is thereby determined. All of the performance data is given at approximately f/1.4 full aperture in image space over a 35 mm cine format (28 mm image diagonal) as illustrated in FIGS. 7 and 8a-8c. As can be seen from the plot, at infinity focus a polychromatic diffraction MTF of around 90% can be achieved at a relatively conservative spatial resolution of 20 cycles/mm. Further, at a high spatial frequency of 40 cycles/mm the MTF is approximately 70% at full-field and approximately 80% on-axis which is still very high. Even with a spatial frequency as high as 60 cycles/mm the MTF is still nearly 50% at full-field and approximately 60% on-axis which would provide adequate performance at this resolution, thus demonstrating the lens design's suitability for use with future high resolution electronic detectors.

FIG. 11b shows MTF plotted against spatial frequency for the same field positions and conditions as in FIG. 11a but for the lens at intermediate focus position F2. Similarly, FIG. 11c shows the MTF versus spatial frequency for the lens at close focus position F3. As can be seen from the plots, the excellent MTF figures are maintained across all focus distances and even at full-field. Further, even at a high spatial frequency of 60 cycles/mm and at full-field the MTF never drops below about 50% showing the excellent image quality attainable across the field and at all focus distances at full aperture of approximately f/1.4.

Second Embodiment

Figure 12:
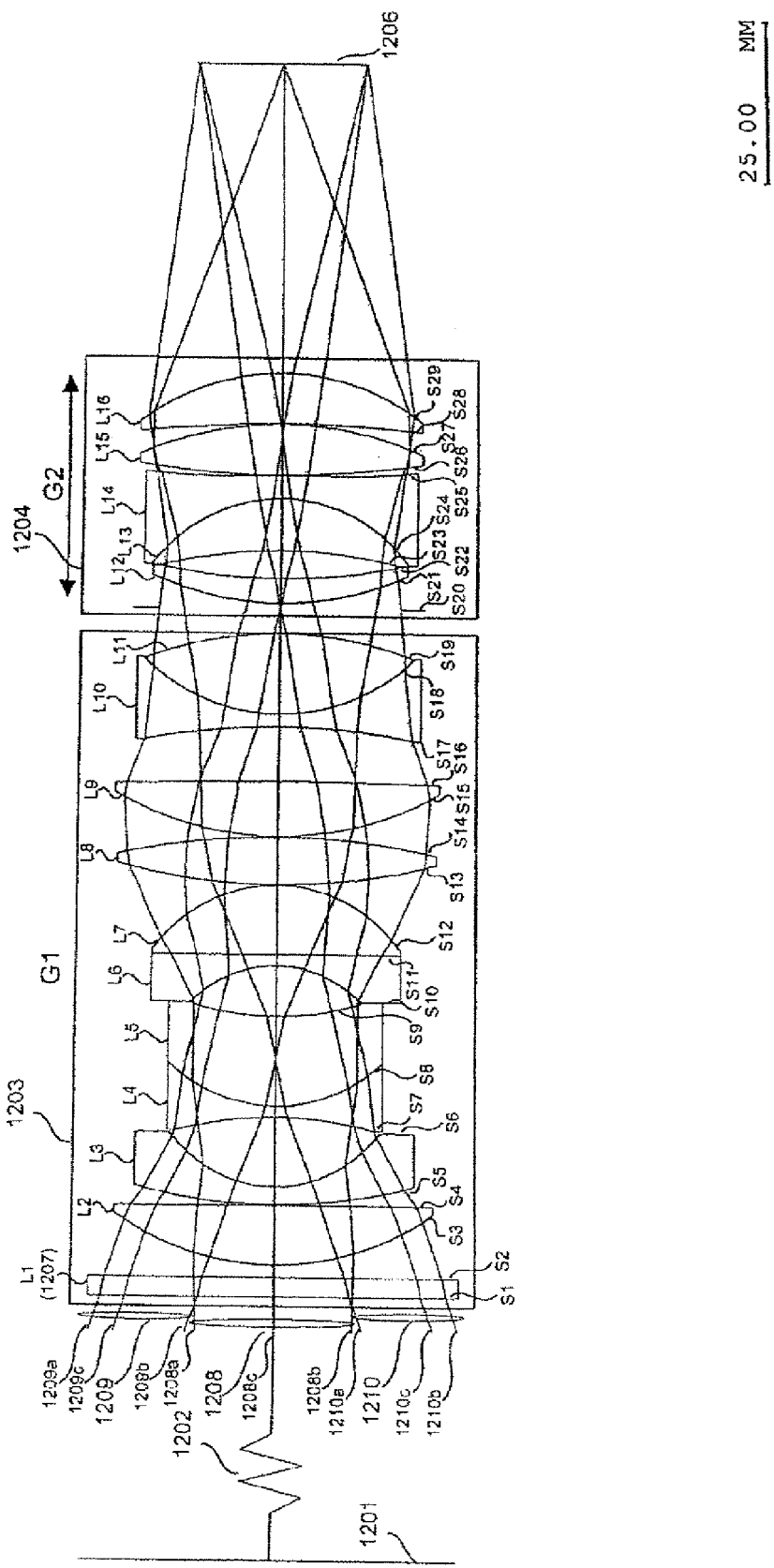
FIG. 12 is a schematic diagram showing the optical lens design of a second embodiment of the present invention.

Turning now to FIG. 12, in a second embodiment of the present invention a medium-angle prime lens with a fixed focal length of substantially 40 mm is shown comprising a number of lens elements. The lens 1200 utilises the lens group power configuration illustrated in FIG. 5 and described above. Each lens element is again identified by a label comprising the letter 'L' and a numeral 1 through 16. The shape and configuration of each lens element being as depicted while the specific radius of each lens surface is given in Table 3, each surface again being identified by a label comprising the letter 'S' followed by a numeral. The surfaces are numbered in sequence starting at S1 for the surface nearest the object side of the lens and ending S29 for the last optical surface at the rear of the lens. While only the lens elements L 1 to L16 are shown in FIG. 11 it is to be understood that conventional mechanical devices and mechanisms are provided (but not shown) for supporting the lens elements and for causing axial movement of the moveable lens groups in a conventional lens housing or barrel.

TABLE 3

Optical Prescription

| Item | Group | Surface | Focus Position | Separation (mm) | Radius or Curvature[1] (mm) | Material[2] Type | Material[2] Code | Material[2] Name | Aperture Half Diameter (mm) |
|---|---|---|---|---|---|---|---|---|---|
| Object Plane | | S0 | F1 | 1000010.000 | Flat | Air | | | |
| | | | F2 | 470.000 | | | | | |
| | | | F3 | 206.000 | | | | | |
| L1 | G1 | S1 | All | 3.000 | Flat | Glass | 516641 | SBSL7 | 28.25 |
| | | S2 | All | 2.000 | Flat | Air | | | 27.56 |
| L2 | G1 | S3 | All | 9.323 | 45.130 | Glass | 497816 | SFPL51 | 24.26 |
| | | S4 | All | 0.100 | −4334.716 | Air | | | 23.28 |
| L3 | G1 | S5 | All | 2.792 | 87.202 | Glass | 487702 | SFSL5 | 21.12 |
| | | S6 | All | 11.027 | 20.175 | Air | | | 16.42 |
| L4 | G1 | S7 | All | 1.800 | −61.449 | Glass | 439950 | SFPL53 | 16.09 |
| L5 | G1 | S8 | All | 14.145 | 25.245 | Glass | 804396 | SLAH63 | 15.58 |
| | | S9 | All | 7.958 | 47.103 | Air | | | 13.67 |
| L6 | G1 | S10 | All | 1.800 | −19.395 | Glass | 801350 | SLAM66 | 13.64 |
| L7 | G1 | S11 | All | 10.933 | −2732.494 | Glass | 497816 | SFPL51 | 17.40 |
| | | S12 | All | 0.100 | −24.846 | Air | | | 18.89 |
| L8 | G1 | S13 | All | 7.549 | 103.628 | Glass | 762401 | SLAM55 | 24.31 |
| | | S14 | All | 0.100 | −121.611 | Air | | | 24.57 |
| L9 | G1 | S15 | All | 8.744 | 54.374 | Glass | 801.350 | SLAM66 | 25.11 |
| | | S16 | All | 8.620 | −807.872 | Air | | | 24.69 |
| L10 | G1 | S17 | All | 1.987 | −119.748 | Glass | 750353 | SNBH51 | 21.93 |
| L11 | G1 | S18 | All | 12.620 | 32.452 | Glass | 439950 | SFPL53 | 20.54 |
| | | S19 | F1 | 6.990 | −64.007 | Air | | | 20.59 |
| | | | F2 | 3.865 | | | | | |
| | | | F3 | 0.800 | | | | | |
| Stop | G2 | S20 | All | 0.900 | Flat | Air | | | 19.98 |
| L12 | G2 | S21 | All | 3.794 | 52.938 | Glass | 439950 | SFPL53 | 19.56 |
| | | S22 | All | 4.461 | 95.994 | Air | | | 19.20 |
| L13 | G2 | S23 | All | 8.191 | −81.846 | Glass | 439950 | SFPL53 | 19.15 |
| L14 | G2 | S24 | All | 3.578 | −26.5117 | Glass | 805254 | STIH16 | 19.05 |
| | | S25 | All | 0.099 | −556.349 | Air | | | 21.07 |
| L15 | G2 | S26 | All | 7.902 | 156.116 | Glass | 808228 | SNPH1 | 21.58 |
| | | S27 | All | 0.100 | −60.525 | Air | | | 21.93 |
| L16 | G2 | S28 | All | 7.837 | −214.156 | Glass | 497816 | SFP151 | 21.82 |
| | | S29 | F1 | 44.800 | −39.670 | Air | | | 21.85 |
| | | | F2 | 47.925 | | | | | |
| | | | F3 | 50.990 | | | | | |
| Image Plane | | S30 | All | 0.00 | Flat | Air | | | |

Notes:-
[1]Surface profiles of aspheric surfaces 6 and 25 are governed by the following conventional equation:

$$Z = \frac{CURV(R)^2}{1 + (1 - (1+K)(CURV)^2 R^2)^{1/2}} + (A)R^4 + (B)R^6 + (C)R^8 + (D)R^{10} + (E)R^{12} + (F)R^{14}$$

where:
CURV = 1/(Radius of Curvature)
K, A, B = Coefficients
Z = Position of surface profile for a given Y value or measured along the optical axis from the pole (i.e. axial vertex) of the surface
R = Radial aperture height of surface measured from the X and V axis, where:
R = $(X^2 + Y^2)^{1/2}$
The coefficients for the surface S6 are:
K = −0.5829, A = 0.8137 × $10^{-05}$, B = −0.1474 × $10^{-07}$, C = 0.2636 × $10^{-09}$, D = −0.1479 × $10^{-11}$, E = 0.4687 × $10^{-14}$ and F = −0.6151 × $10^{-17}$.
The coefficients for the surface S25 are:
K = 0.0000, A = 0.4348 × $10^{-05}$, B = 0.4069 × $10^{-09}$, C = −0.1918 × $10^{-11}$, D = 0.1164 × $10^{-14}$, E = −0.1345 × $10^{-17}$ and F = 0.1221 × $10^{-20}$.
[2]The glasses listed are available from Ohara Corporation.

The optical prescription data contained with Table 3 is arranged in an identical fashion to the data for the first embodiment contained within Table 1 and therefore in the interests of brevity further description will be omitted here. All the surfaces are spherical with the exception of lens surfaces S6 and S25 which are aspheric surfaces that are non-spherical, non-plano but rotationally symmetrical about the optical axis. The surfaces S6 and S25 are aspheric surfaces for which the 'radius of curvature' is a base radius and the formula and coefficients for those two surfaces are set forth as a footnote to Table 3.

As with FIG. 7, the position of the object to be imaged is indicated by the vertical line 1201 (or S0 in the prescription of Table 3) crossing the optical axis at the object side of the lens. The horizontal position of the object to be imaged (and therefore focus distance) may vary and this is indicated by the jagged line 1202 between the first optical surface S1 and the object plane S0. The image plane 1206 is indicated by a vertical line in image space to the right of the last optical surface and as before the image plane is a 28 mm image diagonal.

The grouping of the lens groups into a first lens group G1 and a second lens group G2 (corresponding the respective groups shown in FIG. 5) is indicated by boxes 1203 and 1204 respectively. The first lens group 1203 is axially stationary while the second lens group 1204 is movable in both directions about the optical axis in a monotonic fashion in order to transfer radiation emanating from the object 1201 to the image plane 1206. In accordance with the lens group configuration of FIG. 5 both the first lens group 1203 and the second lens group 1204 are positively powered. More specifically the respective focal lengths of each group are +130.77 mm and +62.22 mm respectively.

Again, in addition to the optical elements L2 to L11 and for substantially the same reasons, the first lens group 1203 comprises an optical filter element (L1) 1207 comprising an element of glass with two flat surfaces S1 and S2.

The first lens group 1203 comprises four singlet lens elements and three doublets containing six elements. From left to right (front of the lens to the back of the lens) these are a positively powered biconvex element L2, a negative meniscus L3 with an aspheric surface S6, a doublet comprising a negative meniscus L4 and a positive meniscus element L5, a second doublet comprising a negative meniscus element L6 and a biconvex element L7, a biconvex singlet L8, a further biconvex singlet L9 and a third doublet comprising a biconcave L10 and a biconvex element L11.

The second lens group 1204 (like the second lens group 705 of the first embodiment) comprises a field stop S20 (or iris diaphragm). Additionally it comprises five lens elements (three singlets and one doublet). In particular, the group 1204 comprises a positive meniscus L12, a doublet comprising a positive meniscus L13 and an aspheric biconcave element, a biconvex singlet L15 and a positive meniscus L16. As in FIG. 7 the iris S20 is located within the second lens group 1205 and moves axially therewith. The size of the aperture of iris S22 is adjustable and, as will be described in more detail below, the lens is capable of excellent performance even with the iris open at a full aperture of approximately f/1.4.

The abnormal partial dispersion glass with the designation SFPL51 is used for lens elements L2, L7 and L16 while abnormal dispersion glass type SFPL53 is used for lens elements L4, L11, L12 and L13. In this embodiment a dense flint glass named SNPH1 is used for lens element L15 (G2 S26 . . . 27 in Table 3). The above described abnormal glass types are used for substantially the same reasons as given for the first embodiment and thus further description with be omitted here in the interest of brevity.

Figure 13A:
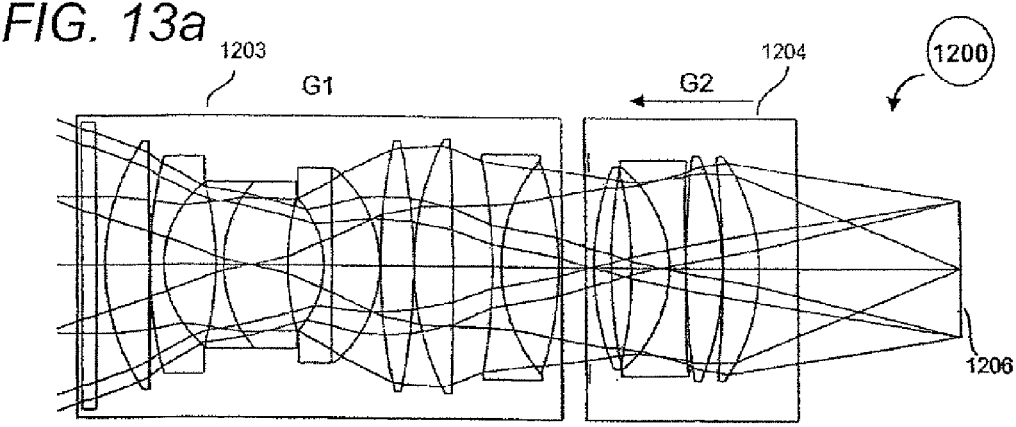
FIGS. 13a, 13b and 13c are schematic diagrams showing the position of the components of the optical lens of FIG. 12 to produce focus distances of infinity, intermediate and close focus respectively.
Figure 13B:
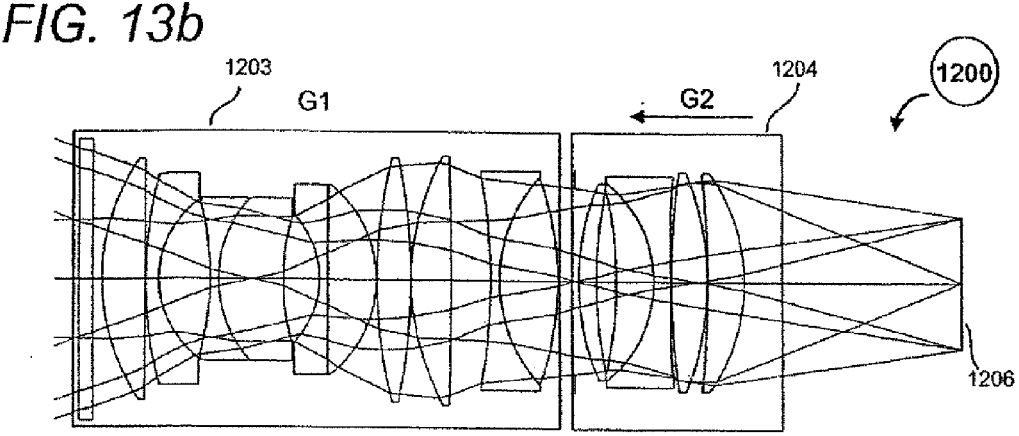
Figure 13C:
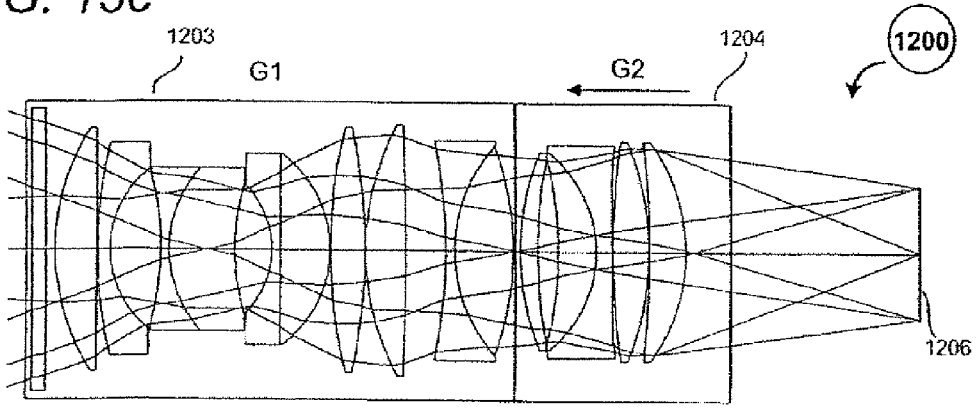

In order to better describe the movement of the second lens group 1204 during focusing, FIGS. 12a to 12c depict the position of the lens groups 1203 and 1204 at three different focus positions. Turning to FIG. 13a the lens system 1200 is shown configured to image an object at infinity. FIG. 13b depicts the position of the lens groups 1203 and 1204 at intermediate focus (determined to be when the object plane is approximately 47 cm from the first optical surface S1) while FIG. 12c depicts the position of the lens elements at close focus (approximately 20.6 cm from the first optical surface). The specific distances between the groups for the three focus positions F1, F2 and F3 (infinity, intermediate and close) are given in Table 3 as the separation distance for S19 which corresponds to the separation between the first lens group 1203 and the second lens group 1204. The arrows depict the direction of motion of the second group 1204 as it is moved between the focus positions F1 to F3. The second lens group 1204 moves from left to right (towards the rear of the lens) with decreasing focus distance. The second lens group 1204 is of course operable to move in the opposite direction when increasing focus distance. The second lens group 1204 is each axially moveable independently and its respective movements are coordinated by any convenient means, such as conventional mechanical devices such as cams or the like to accomplish the desired focusing functionality.

FIGS. 12 and 13a to 13c depict ray traces of on-axis 1208 and full-field upper and lower ray bundles 1209 and 1210. For each ray bundle 1208, 1209 and 1210, respective upper and lower rim rays 1207a, 1208a, 1209a and 1207b, 1208b, 1209b and chief rays 1207c, 1208c and 1209c are shown with the on-axis chief ray lying on the optical axis 1202.

Optical performance data of the prime lens system 1200 is set forth below in Table 4 wherein the full-field relative illumination in percent (%) and the full-field distortion in percent (%) is given for each of the focus positions F1 to F3 (as referred to in Table 3 and depicted in FIGS. 13a to 13c) and normalized image heights ranging from 0 to 1. Note that the full-field relative illumination (corresponding to the maximum image height) in Table 2 ranges from 45.1% to 52.3% across the focus range given by the three focus positions F1 to F3. As already stated above a full-field relative illumination in the region of 40% is preferred in order to minimize shading at the corners of an image when used with state of the art detectors and thus the relative illumination performance of the lens is satisfactory for this application. Note also that low distortion of less than −2.41% is maintained across the focus range.

It is preferred for the variation in the full-field relative illumination provided by a plurality of optical imaging systems at substantially constant focus position to be less than 50% of the lowest full-field illumination, as can be seen from the relative illumination values for the lenses in Tables 2 and 4 at focus positions F1 to F3. If a thin gel filter or stocking filter is employed for softening the image, then if the variation of relative illumination is less than or equal to 50%, the optical effect for different focal length lenses is reduced.

TABLE 4

| Relative Illumination (%) and Distortion (%) | | | | | | |
|---|---|---|---|---|---|---|
| Focus Position | Performance Data Description | Normalized Image Height | | | | |
| | | 0 | 0.40 | 0.65 | 0.85 | 1 |
| F1 | Distortion | 0 | −0.44 | −0.82 | −1.12 | −1.34 |
| | Relative Illumination | 100 | 84.4 | 71.6 | 57.5 | 45.1 |
| F2 | Distortion | 0 | −0.50 | −1.02 | −1.52 | −1.93 |
| | Relative Illumination | 100 | 85.0 | 71.7 | 59.3 | 47.3 |
| F3 | Distortion | 0 | −0.54 | −1.18 | −1.84 | −2.41 |
| | Relative Illumination | 100 | 87.5 | 74.9 | 64.0 | 52.3 |

As per the first embodiment breathing has been calculated in accordance with equation (1) as being +2.8% for the 40 mm lens which is comparable to the low value of +2.4% obtained for 18 mm lens of the first embodiment already described above.

Figure 14A:
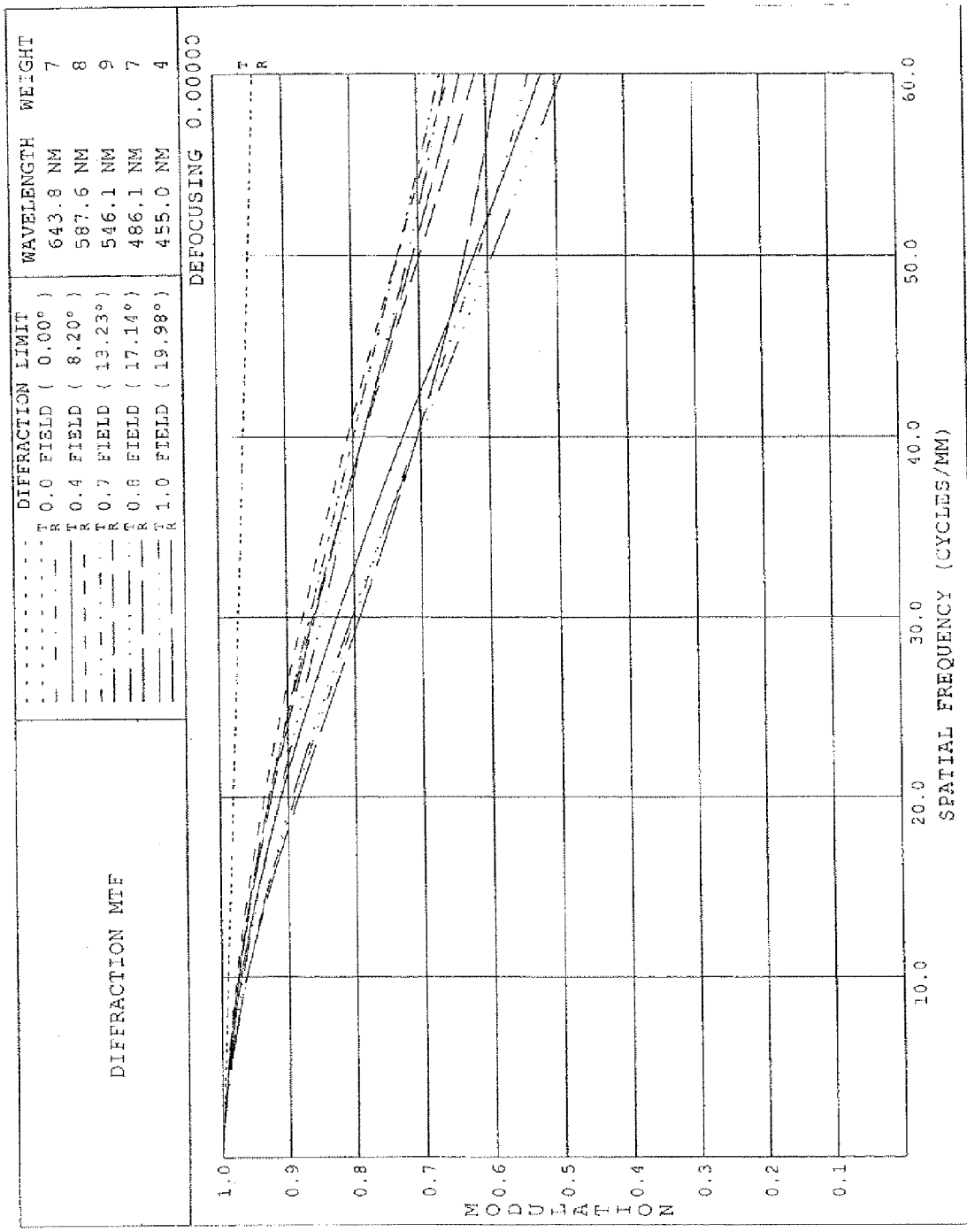
FIGS. 14a, 14b and 14c are performance diagrams of the objective lens system of FIG. 12 illustrating contrast (MTF modulation in %) over the field of view versus resolution (spatial frequency in cycles/mm) measured at the image surface for three focus distances of FIGS. 13a, 13b and 13c respectively.
Figure 14B:
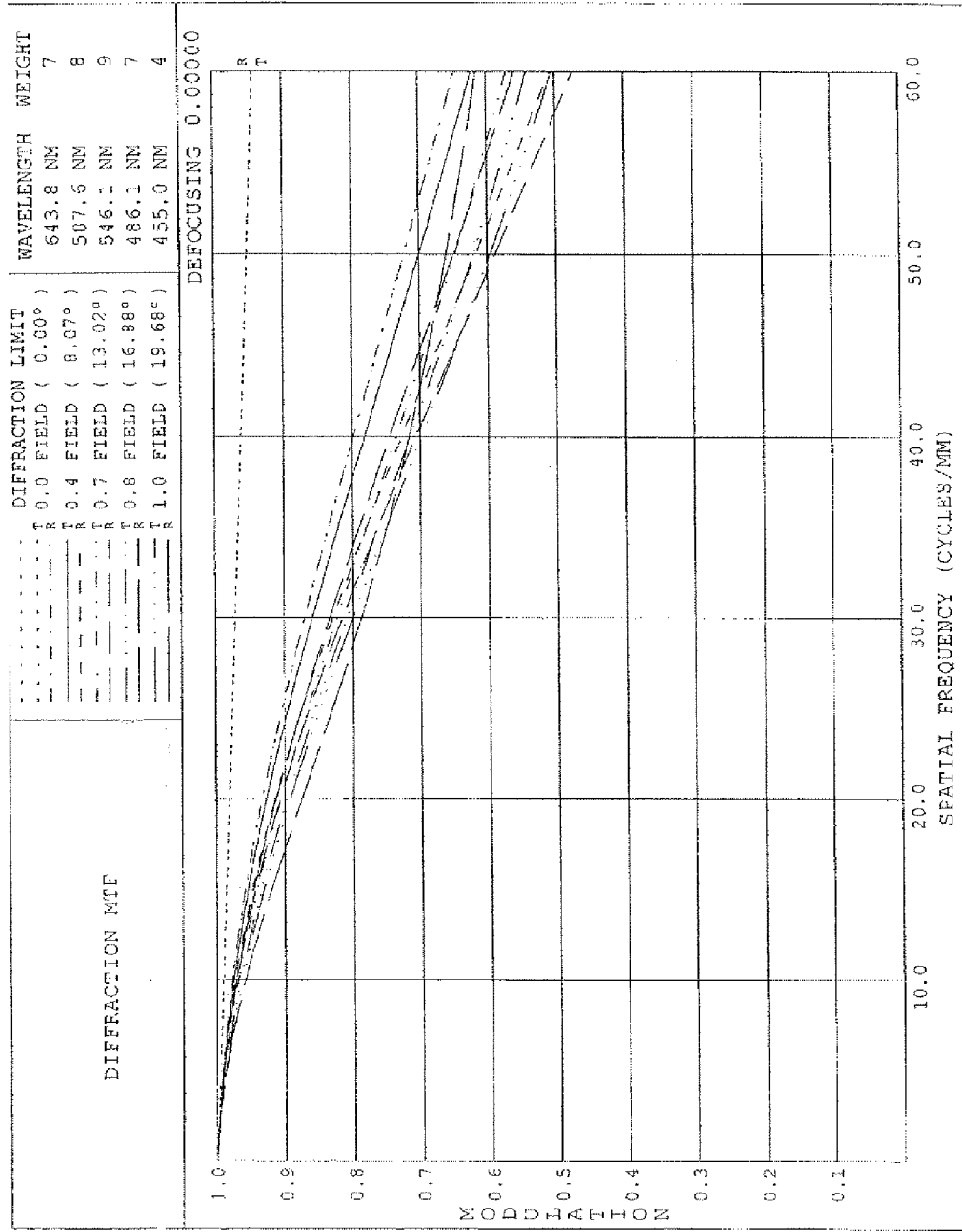
Figure 14C:
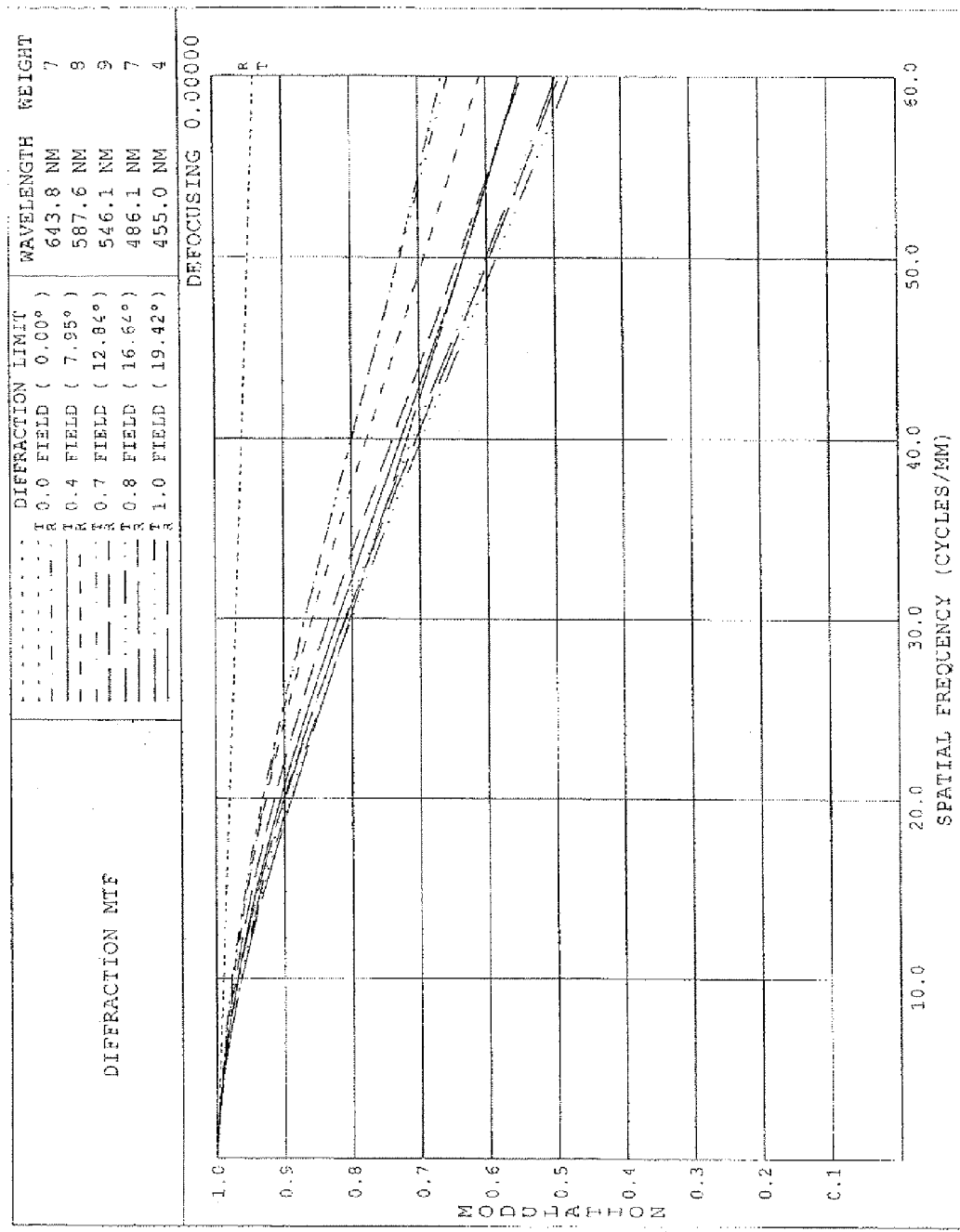

Further optical performance data is set forth in FIGS. 14a to 14c which comprise plots showing the diffraction based polychromatic modulation transfer function or 'MTF' as a percentage versus spatial frequency for the lens of the second embodiment 1200 at the three focus positions F1, F2 and F3 respectively.

Turning now to FIG. 14a, the tangential and radial (T and R) MTF at 5 field positions ranging from on-axis (0.00°) to full-field (19.42°) is shown. All of the performance data is again given at approximately f/1.4 full aperture in image space over a 35 mm cine format (28 mm image diagonal) as illustrated in FIGS. 12 and 13a-13c. As can be seen from the plot, at infinity focus a polychromatic diffraction MTF of around 90% is achieved at a conservative spatial resolution of 20 cycles/mm. Further, at a higher spatial frequency of 40 cycles/mm the MTF is still approximately 70% at full-field and approximately 80% on-axis. Even with a spatial frequency as high as 60 cycles/mm the MTF is still nearly 50% at full-field and as high as 65% for on-axis which would still provide adequate performance at this resolution, thus demonstrating the 40 mm lens design's suitability for use with future high resolution electronic detectors.

FIG. 14*b* shows MTF plotted against spatial frequency for the same field positions and conditions as in FIG. 14*a* but for the lens at intermediate focus position F2. Similarly, FIG. 14*c* shows the MTF versus spatial frequency for the lens at close focus position F3. As can be seen the excellent MTF figures are maintained across all focus distances and even at full-field. Even at a high spatial frequency of 60 cycles/mm and at full-field the MTF just drops below about 50% showing similarly excellent image quality attainable across the field and at all focus distances at full aperture of approximately f/1.4 to that demonstrated above for the 18 mm lens of the first embodiment 700.

Third Embodiment

Figure 15:
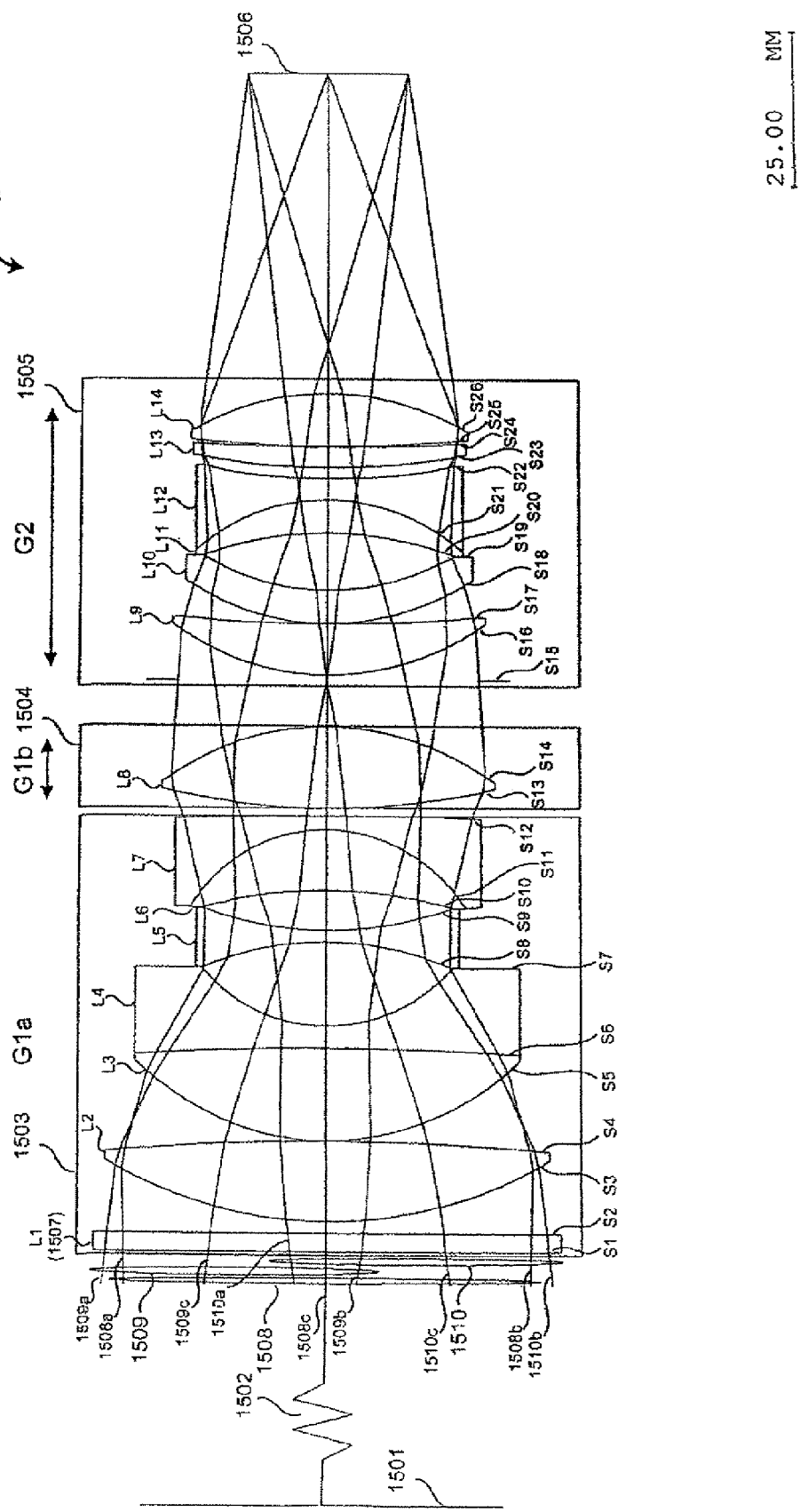
FIG. 15 is a schematic diagram showing the optical lens design of a third embodiment of the present invention.

Turning now to FIG. 15, in a third embodiment of the present invention 1500 a narrow-angle prime lens with a fixed focal length of substantially 100 mm is shown that comprises a plurality of lens elements. The lens 1500 is configured in accordance with the lens group configuration illustrated in FIG. 6 and described above. Each lens element is once again identified by a label comprising the letter 'L' and a numeral from 1 through 14. The shape and configuration of each lens element being as depicted while the specific radius of each lens surface is given in Table 5, each surface once again being identified by a label comprising the letter 'S' followed by a numeral. The surfaces are numbered in sequence starting at S1 for the surface nearest the object side of the lens and ending S26 for the last optical surface at the rear of the lens. As with the previous embodiments, while only the lens elements are shown in FIG. 15, it is to be again understood that conventional mechanical devices and mechanisms are provided (but not shown) for supporting the lens elements and for causing axial movement of the moveable lens groups in a conventional lens housing or barrel.

TABLE 5

Optical Prescription

| Item | Group | Surface | Focus Position | Separation (mm) | Radius of Curvatures[1] (mm) | Material[2] Type | Code | Name | Aperture Half Diameter (mm) |
|---|---|---|---|---|---|---|---|---|---|
| Object Plane | | S0 | F1 | 1000010.000 | Flat | Air | | | |
| | | | F2 | 1440.000 | | | | | |
| | | | F3 | 696.000 | | | | | |
| L1 | G1 | S1 | All | 3.000 | Flat | Glass | 516641 | SBSL7 | 37.42 |
| | | S2 | All | 2.000 | Flat | Air | | | 37.14 |
| L2 | G1 | S3 | All | 13.235 | 74.531 | Glass | 497816 | SFPL51 | 35.58 |
| | | S4 | All | 0.100 | −406.565 | Air | | | 35.09 |
| L3 | G1 | S5 | All | 15.245 | 46.553 | Glass | 744448 | SLAM2 | 30.85 |
| L4 | G1 | S6 | All | 3.597 | −503.689 | Glass | 613443 | SNBM51 | 29.41 |
| | | S7 | All | 13.913 | 29.324 | Air | | | 21.10 |
| L5 | G1 | S8 | All | 1.922 | −54.183 | Glass | 613443 | SNBM51 | 20.99 |
| | | S9 | All | 6.709 | 62.358 | Air | | | 20.97 |
| L6 | G1 | S10 | All | 10.013 | −79.664 | Glass | 762401 | SLAM55 | 21.03 |
| L7 | G1 | S11 | All | 2.232 | −27.830 | Glass | 720347 | SNBH8 | 21.66 |
| | | S12 | F1 | 1.810 | −790.119 | Air | | | 24.53 |
| | | | F2 | 1.313 | | | | | |
| | | | F3 | 0.800 | | | | | |
| L8 | G1 | S13 | All | 13.387 | 126.083 | Glass | 497816 | SFPL51 | 26.32 |
| | | S14 | F1 | 14.200 | −48.590 | Air | | | 26.76 |
| | | | F2 | 7.672 | | | | | |
| | | | F3 | 1.300 | | | | | |
| Stop | G2 | S15 | All | 0.900 | Flat | Air | | | 25.79 |
| L9 | G2 | S16 | All | 8.377 | 46.722 | Glass | 439950 | SFPL53 | 25.27 |
| | | S17 | All | 0.100 | 272.299 | Air | | | 24.80 |
| L10 | G2 | S18 | All | 5.499 | 45.682 | Glass | 808228 | SNPH1 | 23.23 |
| | | S19 | All | 9.442 | 43.594 | Air | | | 21.26 |
| L11 | G2 | S20 | All | 5.399 | −63.953 | Glass | 439950 | SFPL53 | 21.17 |
| L12 | G2 | S21 | All | 3.496 | −35.835 | Glass | 720347 | SNBH8 | 20.96 |
| | | S22 | All | 1.758 | 154.866 | Air | | | 21.52 |
| L13 | G2 | S23 | All | 3.427 | 128.774 | Glass | 80822 | SNPH1 | 21.99 |
| | | S24 | All | 0.100 | 488.134 | Air | | | 22.15 |
| L14 | G2 | S25 | All | 8.588 | 256.724 | Glass | 804466 | SLAH65 | 22.26 |
| | | S26 | F1 | 44.800 | −48.840 | Air | | | 22.40 |
| | | | F2 | 51.824 | | | | | |
| | | | F3 | 58.709 | | | | | |

TABLE 5-continued

Optical Prescription

| Item | Group | Surface | Focus Position | Separation (mm) | Radius of Curvatures[1] (mm) | Material[2] Type | Material[2] Code | Material[2] Name | Aperture Half Diameter (mm) |
|---|---|---|---|---|---|---|---|---|---|
| Image Plane | | S27 | All | 0.000 | Flat | Air | | | |

Notes:.
[1]Surface profiles of aspheric surfaces 7 and 22 are governed by the following conventional equation:

$$Z = \frac{CURV(R)^2}{1 + (1 - (1+K)(CURV)^2 R^2)^{1/2}} + (A)R^4 + (B)R^6 + (C)R^8 + (D)R^{10} + (E)R^{12} + (F)R^{14}$$

where:
CURV = 1/(Radius of Curvature)
K, A, B= Coefficients
Z = Position of surface profile for a given Y value or measured along the optical axis from the pole (i.e. axial vertex) of the surface
R = Radial aperture height of surface measured from the X and Y axis, where:
$R = (X^2 + Y^2)^{1/2}$
The coefficients for the surface S7 are:
$K = 0.3518, A = -0.1.071 \times 10^{-05}, B = -0.1440 \times 10^{-08}, C = -0.3022 \times 10^{-12}, D = -0.5736 \times 10^{-14}, E = 0.5900 \times 10^{-17}$ and $F = -0.1142 \times 10^{-19}$.
The coefficents for the surface S22 are: .
$K = -0.0000, A = 0.3358 \times 10^{-05}, B = -0.1009 \times 10^{-08}, C = 0.3184510^{-11}, D = -0.1293 \times 10^{-13}, E = 0.2044 \times 10^{-16}$ and $F = -0.1237 \times 10^{-19}$.
[2]The glasses listed are available from Ohara Corporation.

The optical prescription data contained with Table 5 is arranged in an identical fashion to the data for the first and second embodiments contained within Tables 1 and 3 and, therefore, in the interests of brevity further description will be omitted here. All the surfaces are spherical with the exception of lens surfaces S7 and S22 which are aspheric surfaces that are non-spherical, non-plano but rotationally symmetrical about the optical axis. S7 and S22 are aspheric surfaces for which the 'radius of curvature' is a base radius and the formula and coefficients for those two surfaces are set forth as a footnote to Table 5.

Similar to FIGS. 7 and 11, the position of the object to be imaged is once again indicated by the vertical line 1501 (S0 in the prescription) crossing the optical axis at the object side of the lens. The horizontal position of the object to be imaged (and therefore focus distance) may vary and this is indicated by the jagged line 1502 between the first optical surface S1 and the object plane S0. The image plane 1506 is indicated by a vertical line in image space to the right of the last optical surface S26. In this embodiment (as with the previous embodiments) the image plane is a 28 mm image diagonal.

The grouping of the lens groups into sub-lens groups G1a and G1b and second lens group G2 (in this embodiment the groups correspond to the respective groups shown in FIG. 6) is indicated by the boxes 1503, 1504 and 1505 respectively. The second sub-lens group (G1b) 1504 and the second lens group 1505 (G2) are movable in both directions about the optical axis in a monotonic fashion for focusing the object 1501 on the image plane 1506. The optical power of the first sub-lens group 1503, the second sub-lens group 1504 and the second lens group 1505 is negative, positive and positive respectively. More specifically the respective focal lengths of each group are
−133.05 mm, +72.21 mm and +78.704 mm. It should be noted that regardless of focus position the combined focal length of the first and second sub-lens groups 1503 and 1504 is always positive which is consistent with the lens configuration of FIGS. 5 and 6.

In addition to the lens elements L1 to L7 the first lens group 1503 further comprises an optical filter element (L1) 1507 which functions in a manner that substantially corresponds to that of the first and second embodiments and, therefore, further description will be omitted here in the interests of brevity.

As shown in FIG. 15, the first sub-lens group (G1a) 1503 of this embodiment comprises a positively powered biconvex singlet L2, a first doublet comprising a biconvex element L3 and a biconcave element L4 with an aspheric surface S7, a biconcave singlet L5 and a second doublet comprising a positive meniscus L6 and a negative meniscus element L7. The surface profile of the aspheric surface S7 of L4 is governed by the equation and coefficients given in the footnote of Table 5. The second sub-lens group (G1b) 1504 of this embodiment comprises only a single biconvex lens element L8.

The second lens group 1505 (G2) comprises a field stop S22 (or iris diaphragm) and six lens elements comprising (from left to right) a positive meniscus singlet L9, a second low power meniscus singlet L10, a doublet comprising a positive meniscus L11 and a biconcave element L12 comprising an aspheric surface S22, a third positive meniscus lens L13 and a biconvex element L14. The surface profile of the aspheric surface S22 of L12 is governed by the relevant equation and coefficients given in the footnote of Table 5. As with the corresponding configuration shown in FIG. 6, the iris S22 is located within the second lens group 1505 and moves axially therewith.

The abnormal dispersion glass with the designation SFPL51 is used for lens elements L2, L7 and L16 while abnormal dispersion glass type SFPL53 is used for lens elements L4, L11, L12 and L13. In this embodiment a dense flint glass named SNPH1 is also employed. The above described abnormal glass types are used for the same reasons as given for the first embodiment and thus further description will be omitted here in the interests of brevity.

Figure 16A:
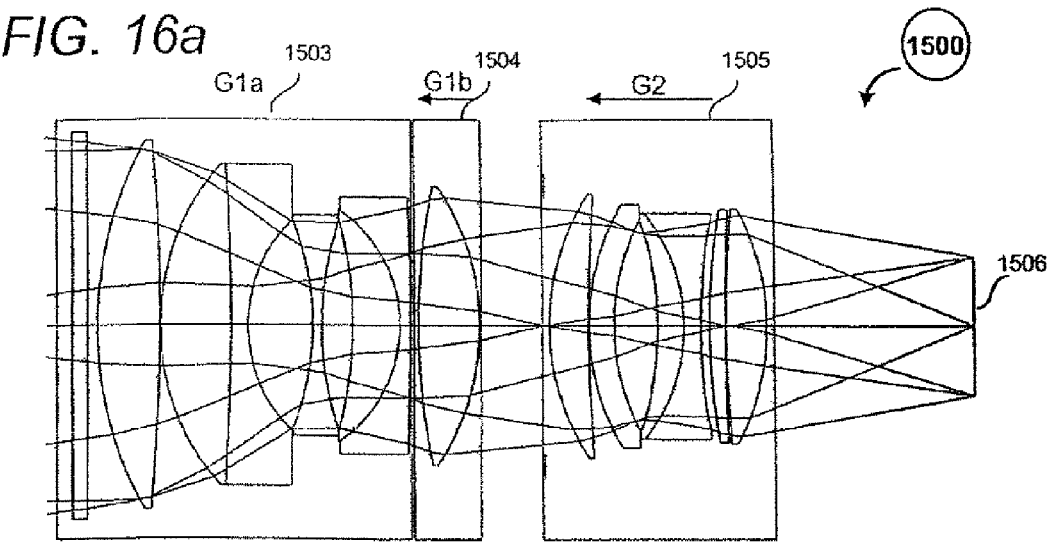
FIGS. 16a, 16b and 16c are schematic diagrams showing the position of the components of the optical lens of FIG. 15 to produce focus distances of infinity, intermediate and close focus respectively.
Figure 16B:
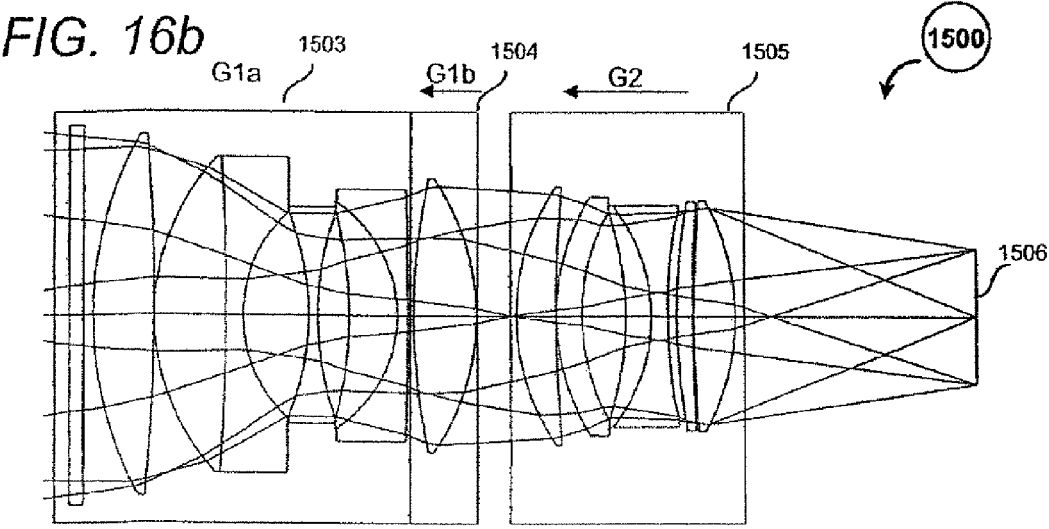
Figure 16C:
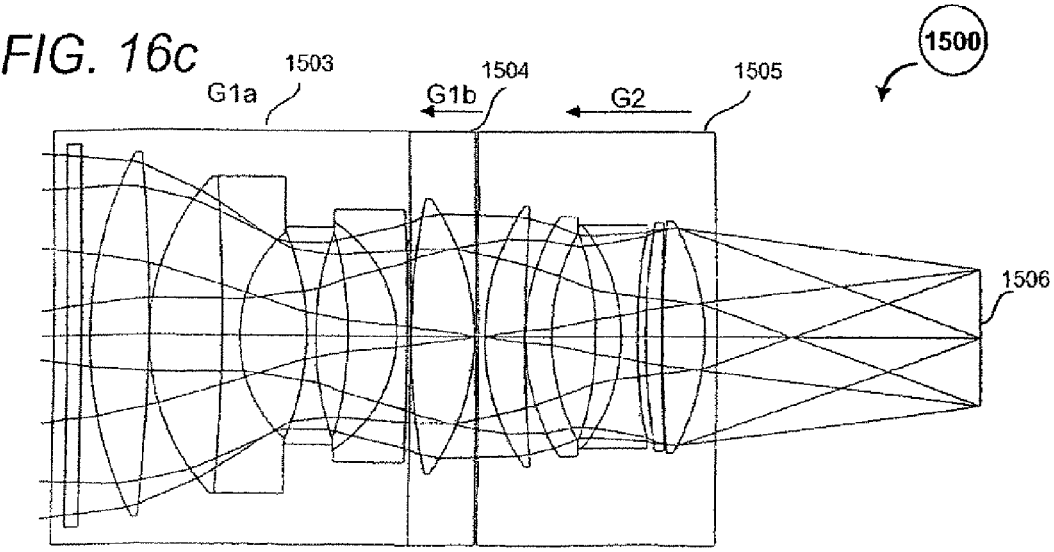

In order to better describe the movement of the groups during focusing, FIGS. 16a to 16c depict the position of the lens groups at three different focus positions F1 to F3. Turning to FIG. 16a the lens system is shown configured to image an object at infinity. FIG. 16b depicts the position of the lens groups at intermediate focus (determined to be when the object plane is approximately 144 cm from the first optical surface S1) while FIG. 16c depicts the position of the lens elements at close focus (approximately 69.6 cm from the first optical surface). The specific distances between the groups for the three focus positions F1, F2 and F3 (infinity, intermediate and close) are given in Table 1 as the separation distances for S12 and S14 which corresponds to the separation between the first sub-lens group 1503 and the second sub-lens group 1504 and the separation between the second sub-lens group 1504 and the second lens group respectively 1505. The arrows depict the direction of motion of the groups as they are moved between focus positions. Both the second sub-lens group 1504 and the second lens group 1505 move from right to left (towards object space) with decreasing focus distance. The lens groups 1504 and 1505 are of course operable to move in the opposite direction when increasing rather than decreasing the focus distance.

The groups 1504 and 1505 are each axially moveable independently and their respective movements are coordinated by any convenient means, such as conventional mechanical devices such as cams or the like to accomplish the desired focusing functionality. The respective axial movement of the second sub-lens group 1504 is coordinated with the second lens group 1505.

FIGS. 15 and 16a to 16c depict ray traces of on-axis 1508 and full-field upper and lower ray bundles 1509 and 1510. For each ray bundle 1508, 1509 and 1510, respective upper and lower rim rays 1507a, 1508a, 1509a and 1507b, 1508b, 1509b and chief rays 1507c, 1508c and 1509c are shown with the on-axis chief ray lying on the optical axis.

Optical performance data of the prime lens system is set forth below in Table 6 wherein the full-field relative illumination in percent (%) and the full-field distortion in percent (%) is given for each of the focus positions F1 to F3 and normalized image heights ranging from 0 to 1. Note that the full-field relative illumination (corresponding to the maximum image height) in Table 6 ranges from 53.9% to 64.5% across the focus range given by the three focus positions F1-F3 which is again higher than the value of 40% that is preferred for state of the art detectors. Note also that extremely low distortion of less than −0.33% is maintained across the focus range.

TABLE 6

Relative Illumination (%) and Distortion (%)

| Focus Position | Performance Data Description | Normalized Image Height | | | | |
|---|---|---|---|---|---|---|
| | | 0 | 0.40 | 0.65 | 0.85 | 1 |
| F1 | Distortion | 0 | −0.08 | −0.19 | −0.29 | −0.33 |
| | Relative Illumination | 100 | 85.9 | 74.5 | 63.0 | 53.9 |
| F2 | Distortion | 0 | −0.07 | −0.17 | −0.26 | −0.33 |
| | Relative Illumination | 100 | 84.1 | 71.6 | 61.2 | 53.3 |
| F3 | Distortion | 0 | −0.06 | −0.15 | −0.24 | −0.31 |
| | Relative Illumination | 100 | 93.0 | 82.2 | 72.3 | 64.5 |

Breathing has been calculated for the 100 mm lens of the third embodiment 1500 in accordance with equation (1) giving a value of +8.9% which is significantly higher than the values for the first and second embodiment. The larger breathing for the 100 mm lens is, however, not of concern because a long focal length lens has a small depth of field, which means that the breathing is unlikely to be noticeable in the images produced by the system. The breathing may become noticeable when the iris is stopped down to say f/16, but this might only happen perhaps a small percentage of the time during use.

Figure 17A:
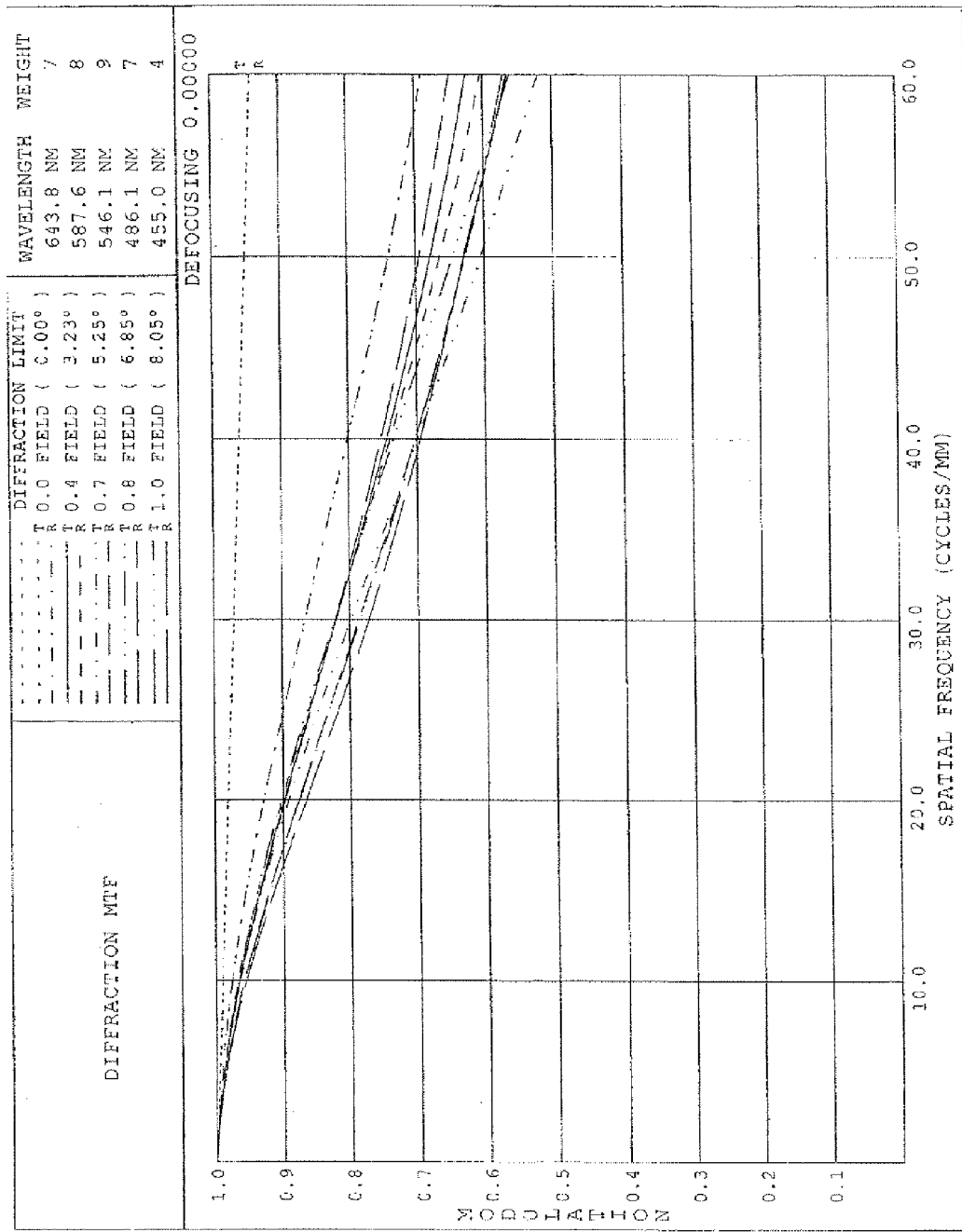
FIGS. 17a, 17b and 17c are performance diagrams of the objective lens system of FIG. 15 illustrating contrast (MTF modulation in %) over the field of view versus resolution (spatial frequency in cycles/mm) measured at the image surface for three focus distances of FIGS. 16a, 16b and 16c respectively.
Figure 17B:
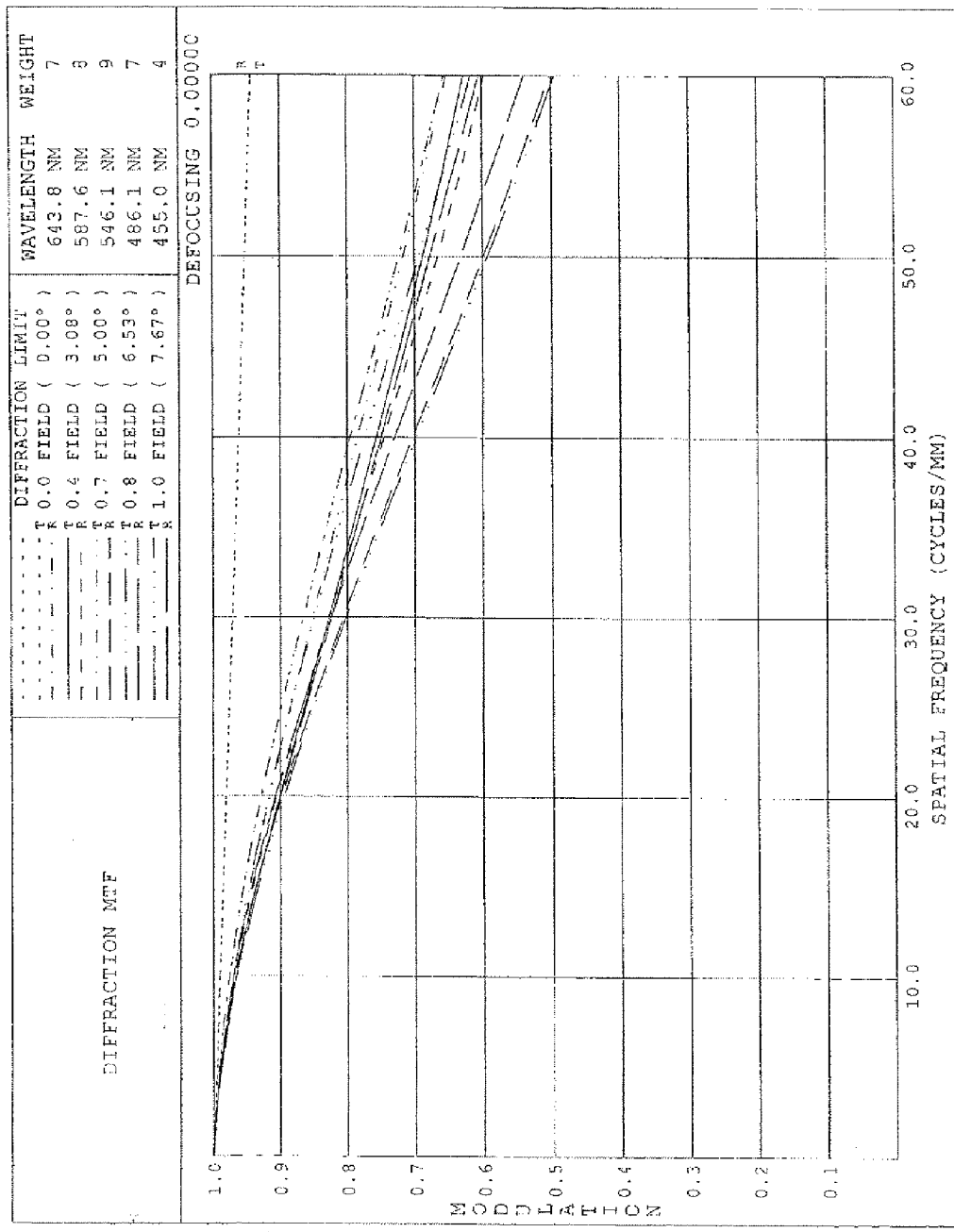
Figure 17C:
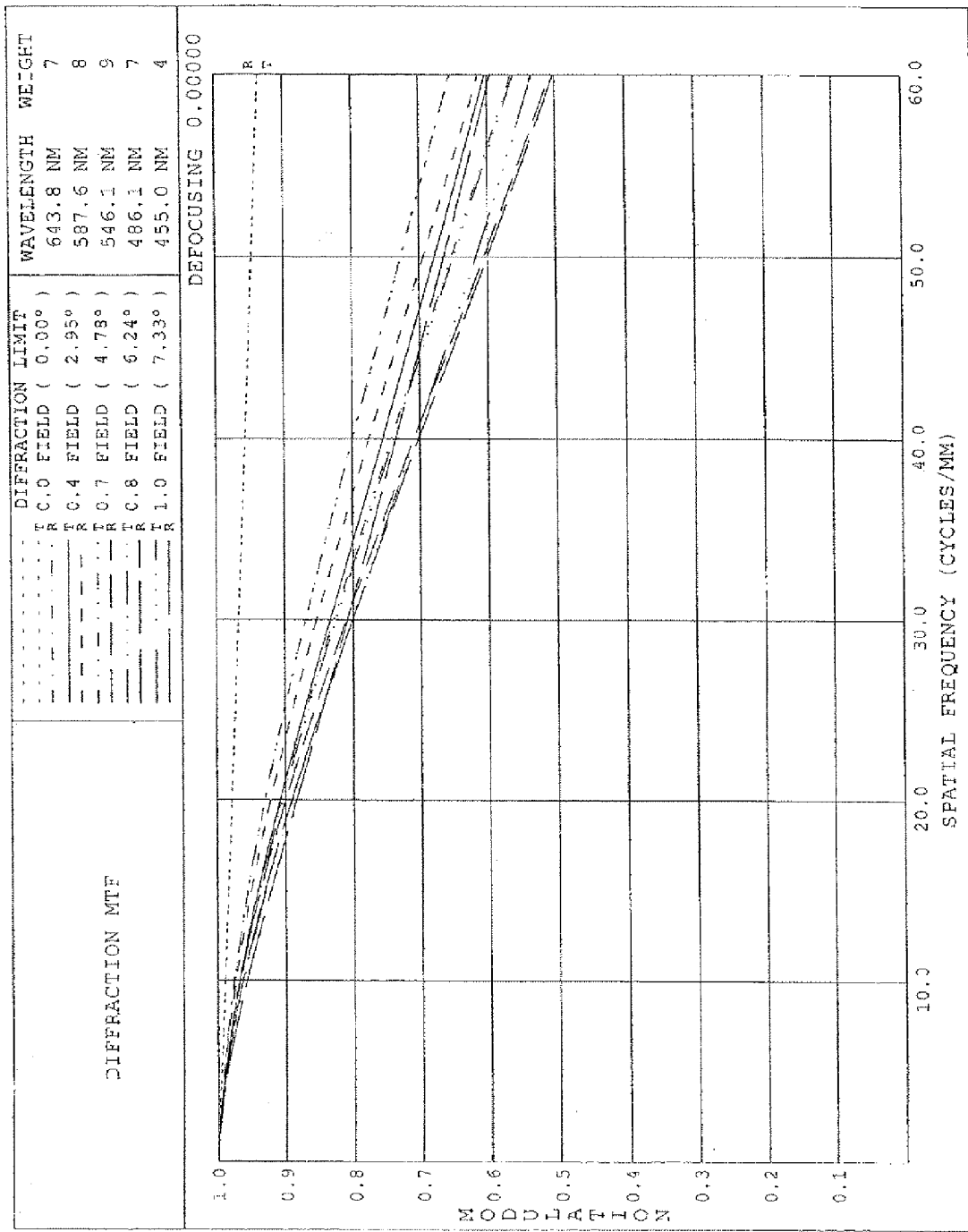

Further optical performance data is set forth in FIGS. 17a to 17c which comprise plots showing the diffraction based polychromatic modulation transfer function or 'MTF' (the modulation at a particular spatial frequency) as a percentage versus spatial frequency for the three focus positions F1, F2 and F3 respectively.

Turning now to FIG. 17a, the tangential and radial MTF is shown at 5 field positions ranging from on-axis (0.00°) to full-field (8.05°). As with FIGS. 11a to 11c and 14a to 14c the spatial frequency is given in cycles/mm. All of the performance data is given at approximately f/1.4 full aperture in image space over a 35 mm cine format (28 mm image diagonal). As can be seen from the plot, at infinity focus a polychromatic diffraction MTF of around 90% can be achieved at a conservative spatial resolution of 20 cycles/mm. Further, at a high spatial frequency of 40 cycles/mm the MTF is approximately 70% at full-field and approximately 80% on-axis which is very high. Even with a spatial frequency as high as 60 cycles/mm the MTF is still nearly 50% at full-field and approximately 60% on-axis which would still provide adequate performance at this resolution, thus demonstrating the lens design's suitability for use with future high resolution electronic detectors.

FIG. 17b shows MTF plotted against spatial frequency for the same field positions and conditions as in FIG. 17a but for the lens at intermediate focus position F2. Similarly FIG. 17c shows the MTF versus spatial frequency for the lens at close focus position F3. As can be seen the excellent MTF figures are maintained across all focus distances and even at full-field. Even at a high spatial frequency of 60 cycles/mm and at full-field the MTF never drops below about 50% showing the excellent image quality attainable across the field and at all focus distances at full aperture of approximately f/1.4.

Electronic detectors tend to provide near optimal optical efficiency when the chief ray angles of radiation falling on the detector pixels are near telecentric, in other words parallel to the optical axis. Since objective lenses commonly have non-telecentric chief ray angles in image space, a micro lens array may be employed to redirect the image space radiation, especially the full-field radiation, so that the radiation is near telecentric when falling on the detector pixels. However, after utilizing such a micro lens array the optical efficiency achieved may still not be as high as that produced for objective lenses having chief ray angles of radiation that are near telecentric. For example, as shown in the white paper "Image Sensor Architectures for Digital Cinematography" by Dalsa Digital Cinema 03-70-00218-01, while the use of micro lenses can increase the fill factor of the pixels, they make the pixel response increasingly dependent on lens aperture and the angle of incident photons. In fast aperture objective lenses of F/2 or less it becomes increasingly difficult for the micro lenses of the micro lens array to make all of the radiation from image space fall on to the sensitive part of the detector pixel. For example, it has been proposed to shift the micro lenses laterally to compensate for high incident angles, but as shown by Lumerical (http://www.lumerical.com/fdtd_microlens/cmos_image_sensor_pixel_microlens.php), the maximum optical efficiency of the system falls to less than half the value of a telecentric chief ray as the incident angle of the ray increases to 30°. In addition, at high angles of incidence, even if the chief ray is incident on the detector pixel, rim rays may have angles of incidence that are significantly greater than that of the chief ray and may be reflected by the micro lens array rather than being captured. Therefore to maximize the optical efficiency of electronic detectors, even with optimized micro lens arrays, it is desirable for objective lenses to have near telecentric or reduced full-field chief ray angles. In addition, for a series of objective lenses used with one or more electronic detectors it is preferable to produce similar optical efficiency for each objective lens with each detector so that consistent image quality is realized.

Full-field ray angle data for the above described three embodiments is provided in Table 7.

TABLE 7

| Lens Focal Length | Ray Position | Full Field Ray Angles (degrees) | | |
|---|---|---|---|---|
| | | Focus Position | | |
| | | F1 | F2 | F3 |
| 18 mm | Chief | 2.156 | 2.152 | 2.148 |
| | Upper | −8.195 | −8.051 | −7.923 |
| | Lower | 14.784 | 15.919 | 17.246 |
| | Average[1] | 3.295 | 3.934 | 4.662 |
| 40 mm | Chief | 8.631 | 8.358 | 8.106 |
| | Upper | −8.698 | −8.193 | −7.776 |
| | Lower | 12.841 | 14.319 | 15.938 |
| | Average[1] | 2.072 | 3.063 | 4.081 |
| 100 mm | Chief | 7.630 | 7.161 | 6.752 |
| | Upper | −9.497 | −8.362 | −7.470 |
| | Lower | 15.825 | 17.630 | 19.241 |
| | Average[1] | 3.164 | 4.634 | 5.886 |

Notes:-
[1] Average ray angle equals Lower ray angle minus ((Lower ray angle minus Upper ray angle)/2).

For each embodiment, ray angle data is provided for three rays chief, upper and lower at three focus positions F1, F2 and F3. Also provided is an average ray angle which is calculated by taking the arithmetical mean of the upper ray angle and the lower ray angle. The average ray angle is a pseudo chief ray angle which is produced for a ray that is approximately geometrically centered within the beam of radiation. This ray angle may be considered more representative than the chief ray angle for optimizing the micro lens array to maximize the corresponding optical efficiency particularly in fast aperture objective lenses of F/2 or less. For all embodiments the chief ray angle is less than 9 degrees and the average ray angle is less than 6 degrees for all focus positions. The low ray angles in Table 7 indicate that high optical efficiency has been potentially achieved for each and all embodiments.

SUMMARY OF ADVANTAGES

The novel optical design construction utilized in the embodiments described above provides several advantages and features. It permits control of the relative illumination to be sufficiently large over the field of view that image shading is reduced while maintaining high image quality (high polychromatic diffraction MTF at elevated spatial frequency).

For example, in the first to third embodiments described above, at a full aperture of approximately F/1.4 with a minimum relative illumination of about 45% at any field position, a polychromatic diffraction MTF of about 80% MTF on-axis and 70% MTF on-axis at a spatial frequency of 40 cycles/mm over a 35 mm cine format (about 28 mm image diagonal) may be achieved at all focus distances and for a variety of lenses including wide angle (18 mm), medium angle (40 mm) and narrow angle (telephoto 100 m) field of view, i.e. short to long focal length. The high relative illumination signifies that when the lens is used with electronic detector cameras there is substantially no shading at the image. The above embodiments provide constant performance (i.e. high relative illumination and high image quality) throughout the focus range and in particular at full aperture of approximately f/1.4 and over a range of different focal length lenses.

The optical design construction also provides a large back focal length (where back focal length is the distance from the lens element optical surface vertex adjacent the image to the image) which is similar in magnitude to the clear aperture diameter of the last optical surface of the last lens element adjacent the image whereby the lens can be attached to both film and electronic based cameras.

Furthermore, the compactness in length and diameter minimizes the volume and weight which makes the lens more versatile such as being suitable for use on a camera supported by a tripod, shoulder mounted or hand held.

In addition all of the prime lenses of different focal lengths described in the embodiments above may have a substantially constant length which makes multiple lens carrying containers more compact.

Another advantage of the lens of the present invention is that when combined with modern film or electronic cameras a high image quality is realized at fast lens apertures of less than F/2 (in particular, around F/1.4 in the embodiments above) thereby making the lens suitable for use in most lighting conditions and especially in very low lighting conditions such as at night time.

A further advantage of the above described embodiments is that in having only one or two movable lens groups the mechanical complexity is minimized thus providing less chance of lens failure and making the lenses more easily serviceable and having a potentially longer life span.

A still further advantage of the above described embodiments is that in having a stationary first lens element adjacent object space, the lens may be sealed which helps reduce ingress of foreign matter that could potentially affect the lens function optically and mechanically. A stationary first lens element is also advantageous for ease of attachment of accessories, such as a matte box and filters, which are preferably mounted on a stationary lens component so that lens functioning is substantially unaffected.

Other advantages of the above described optical imaging systems include each having a variation in full-field chief ray angle (which may be considered in FIG. 7 as the angle of ray 709c (upper) or 710c (lower)) in image space over the focus range of less than 5 degrees and for all of them together at a substantially similar focus distance a variation of less than 10 degrees. In addition, the above described optical imaging systems include each having a full field chief ray angle in image space that is less than 15 degrees. These are all desirable features to maximize the response of modern electronic detectors which prefer smaller variations in the angles described and reduced full field angles.

Alternative Embodiments

In the above embodiments, reference is made to the accompanying drawings that form a part hereof, in which is shown by illustration specific embodiments in which the invention may be practiced. It is to be understood that other embodiments may utilized and structural changes may be made without departing from the scope of the preferred embodiments of the present invention.

In the above described embodiments there are shown three prime lens designs, one for a wide angle lens (18 mm), a medium angle lens (40 mm) and a narrow angle lens (100 mm). In yet further embodiments, other focal lengths are also possible that utilize the novel optical design construction described above and in particular in connection with the configuration of lens groups and general location of aspheric surfaces shown in FIGS. 5 and 6. It is to be understood that prime lenses having other focal lengths falling within the scope of the present invention can be achieved by utilizing the novel optical construction described above and applying conventional optical design optimization to obtain a design fulfilling high relative illumination and MTF performance criteria. In this way a broad range of focal length lenses falling within the scope of the present invention can be provided having all the advantages described above in connection with the 18 mm, 40 mm and 100 mm lenses of the specific embodiments.

In the above described embodiments a single aspherical lens element is positioned in the first lens group. Other embodiments are possible wherein the first lens group comprises more than one aspherical lens element. This may be desirable in order to improve the characteristics of the lens system still further beyond the specific embodiments described above at the expense of a more costly but perhaps more compact design. Further although the aspherical lens element has been described as being located proximal to the front of the lens group it could be placed elsewhere within the lens group if it is, for example, determined through routine optical design optimization to give improved aberration correction for a prescribed set of performance targets.

In the above described embodiments, using the lens configuration shown in FIG. 6, the first sub-lens group is generally negative while the second sub-lens group is positive. However, other embodiments falling within the scope of the present invention are possible wherein either the first sub-group is positive and the second sub-group is positive or where both sub-groups are positively powered. The common consideration is that the combined power of the two sub-groups is positive whatever combination is used. As would be appreciated by a person skilled in the art, the exact lens configuration could be determined for a particular set of performance criteria by performing routine optical design optimization work.

While the embodiments of the present invention described above are fixed focal length lenses that are of the appropriate dimensions for use on a 35 mm Cine format film or electronic detector camera, the dimensions of these fixed focal length lenses may be appropriately scaled up or down for use with various film and electronic detector image formats including, but not limited to, 16 mm, Super 16 mm, 35 mm, 65 mm, IMAX®, OMNIMAX®, and the like and various video formats including high definition television (HDTV), advanced television (ATV) and general analog and digital television.

What is claimed is:

1. A high performance fixed focal length optical imaging system operable to receive radiation from an object space and deliver the received radiation through the optical system so as to form an image at an image surface in an image space, said optical system comprising:
    a first positively powered lens group and a second positively powered lens group arranged in that order from object space to the image space of the optical system and aligned on a common optical axis,
    wherein at least one optical element of the first positively powered lens group and at least one optical element of the second lens group comprise an aspheric optical surface,
    wherein said first positively powered lens group comprises a first sub-lens group and a second sub-lens group wherein the first sub-lens group is stationary and the second sub-lens group is moveable axially about the optical axis for focusing the imaging system, and wherein the second lens group comprises an optical stop.

2. An optical imaging system according to claim 1, wherein said first sub-lens group is positively powered and second sub-lens group is negatively powered and wherein the combined power of the first sub-lens group and the second sub-lens group is positive.

3. An optical imaging system according to claim 1, wherein said first sub-lens group is negatively powered and said second sub-lens group is positively powered and wherein the combined power of the first sub-lens group and the second sub-lens group is positive.

4. An optical imaging system according to claim 1, wherein said first sub-lens group is positively powered and said second sub-lens group is positively powered.

5. An optical imaging system according to claim 1, wherein the first or second lens group comprises abnormal partial dispersion elements.

6. An optical imaging system according to claim 1, wherein the second lens group comprises at least one dense flint element.

7. An optical imaging system according to claim 6, wherein the at least one dense flint element comprises an abnormal partial dispersion glass equivalent to type SNPH1 offered by Ohara Corporation, Branchburg, N.J., USA.

8. An optical imaging system according to claim 6, wherein the at least one dense flint element is positioned adjacent to the second aspheric surface.

9. An optical imaging system according to claim 1, wherein the optical imaging system comprise a substantially constant length at any focus distance regardless of the movement of the lens groups comprising the optical system.

10. An optical imaging system according to claim 1, wherein the optical imaging system comprise a back focal length that is large enough to permit attachment without mechanical collision of the optical imaging system to a camera which contains a reflex mirror.

11. An optical imaging system according to claim 1, wherein the full-field relative illumination provided by the optical system is greater than 35%.

12. An optical imaging system according to claim 11, wherein the variation in full-field relative illumination provided by a plurality of optical imaging systems at substantially constant focus position is less than 50% of the lowest full-field illumination.

13. An optical imaging system according to claim 1, wherein the modulation transfer function (MTF) provided by the optical system at all focus distances is greater than 85% at a spatial frequency of 20 cycles/mm at the image surface.

14. An optical imaging system according to claim 1, wherein the modulation transfer function (MTF) provided by the optical system at all focus distances is greater than 65% at a spatial frequency of 40 cycles/mm at the image surface.

15. An optical imaging system according to claim 1, wherein the modulation transfer function (MTF) provided by the optical system at all focus distances is greater than 45% at a spatial frequency of 60 cycles/mm at the image surface.

16. An optical imaging system according to claim 1, wherein the variation in full field chief ray angle in image space over the focus range is less than 5 degrees.

17. An optical imaging system according to claim 1, wherein the variation in full field ray angle at a substantially constant focus distance is less than 10 degrees for a plurality of optical imaging systems with different focal lengths.

18. A camera that comprises an optical imaging system according to claim 1.

19. A method of producing image data which comprises forming an image on a film or in a detector at an image surface by means of an optical imaging system according to claim 1.

20. A high performance fixed focal length optical imaging system operable to receive radiation from an object space and deliver the received radiation through the optical system so as to form an image at an image surface in an image space, said optical system comprising:
- a first positively powered lens group and a second positively powered lens group arranged in that order from object space to the image space of the optical system and aligned on a common optical axis,
- wherein at least one optical element of the first positively powered lens group and at least one optical element of the second lens group comprise an aspheric optical surface, wherein said first positively powered lens group comprises a first sub-lens group and a second sub-lens group wherein the first sub-lens group is stationary and the second sub-lens group is moveable axially about the optical axis for focusing the imaging system, and wherein the full field chief ray angle in image space over the focus range is less than 15 degrees.

21. An optical imaging system according to claim 20, wherein the full field chief ray angle in image space is less than 15 degrees for a plurality of optical imaging systems with different focal lengths.

22. A high performance fixed focal length optical imaging system operable to receive radiation from an object space and deliver the received radiation through the optical system so as to form an image at an image surface in an image space, said optical system comprising:
- a first positively powered lens group and a second positively powered lens group arranged in that order from object space to the image space of the optical system and aligned on a common optical axis,
- wherein at least one optical element of the first positively powered lens group and at least one optical element of the second lens group comprise an aspheric optical surface, wherein said first positively powered lens group comprises a first sub-lens group and a second sub-lens group wherein the first sub-lens group is stationary and the second sub-lens group is moveable axially about the optical axis for focusing the imaging system, and wherein the full field average ray angle in image space over the focus range is less than 15 degrees.

23. An optical imaging system according to claim 22, wherein the full field average ray angle in image space is less than 15 degrees for a plurality of optical imaging systems with different focal lengths.

* * * * *